March 21, 1961  R. V. WERNER ET AL  2,976,530
MULTIPLE-TARGET TRACKING SYSTEM
Filed Aug. 8, 1958  8 Sheets-Sheet 1

*INVENTOR.*
Robert V. Werner
Walter J. Zable
William J. Thompson
Arthur E. Noyes BY *[signature]*

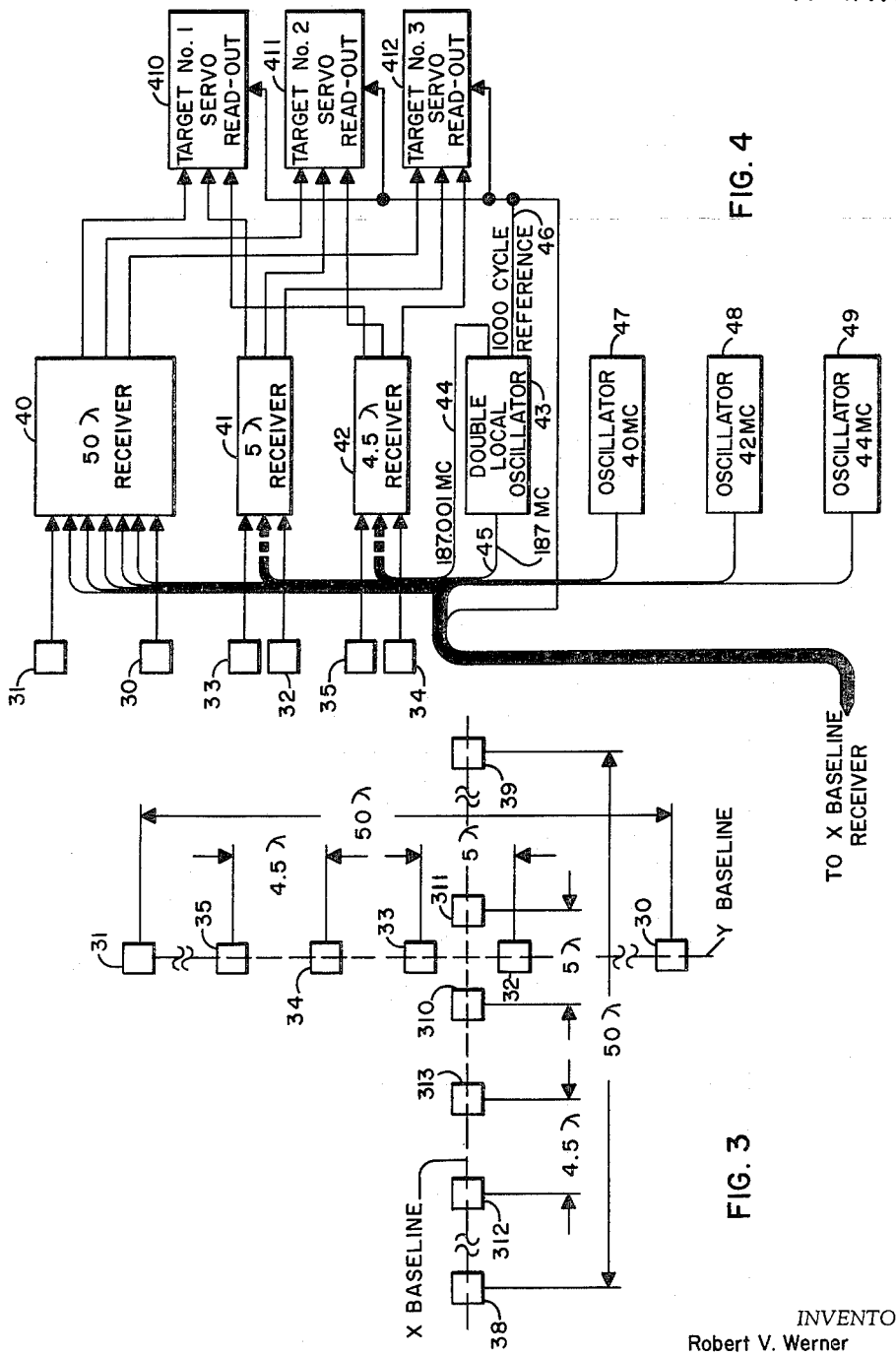

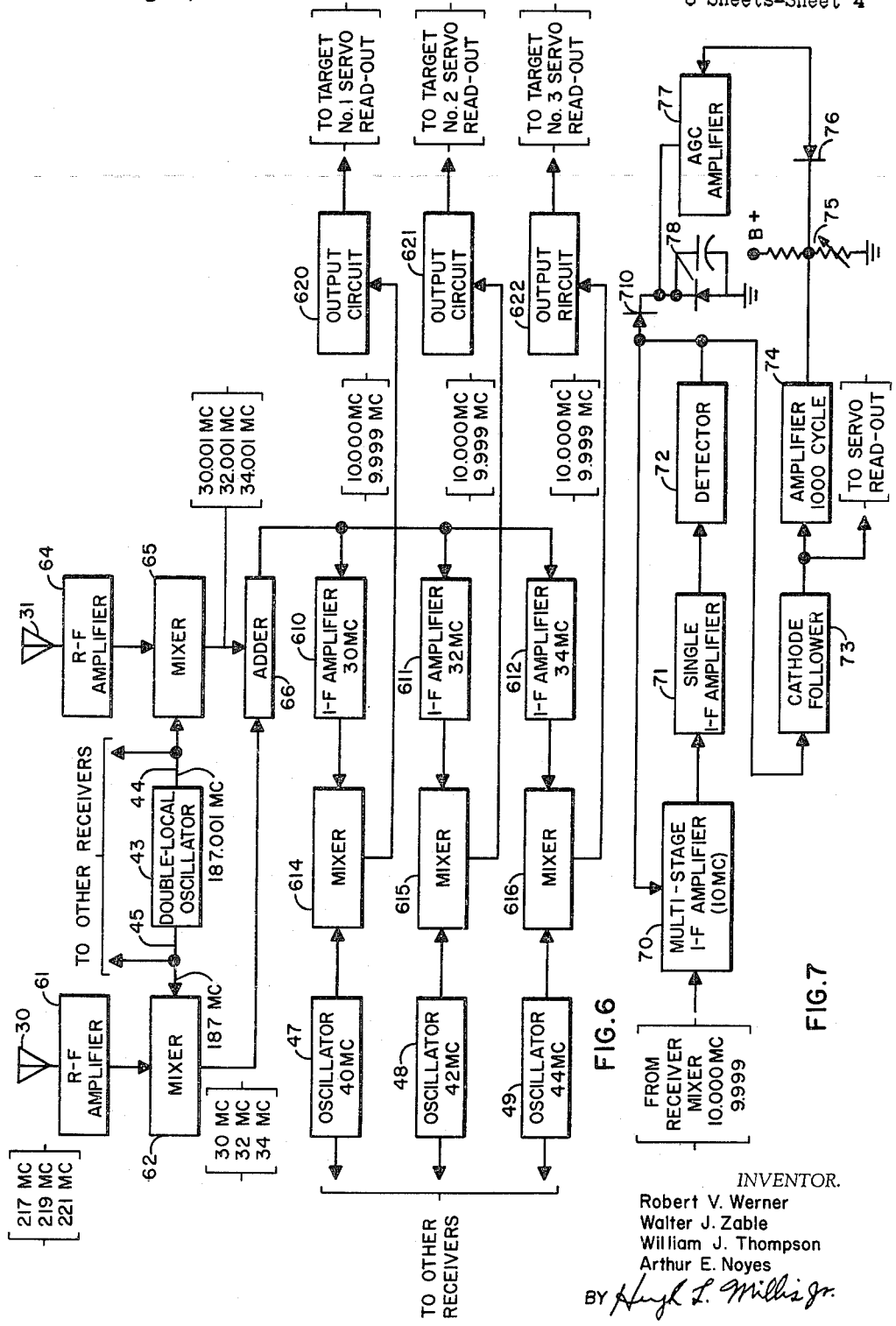

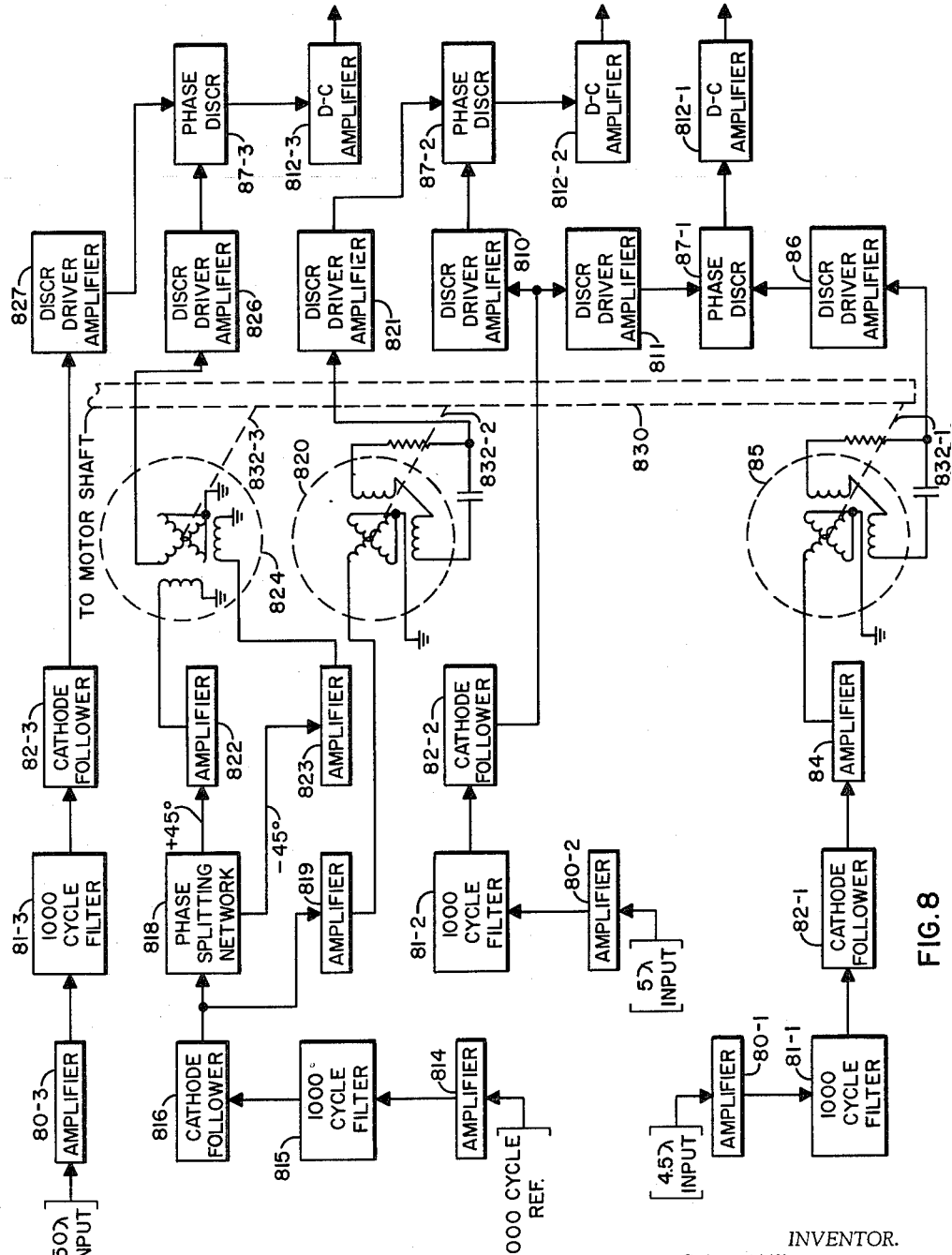

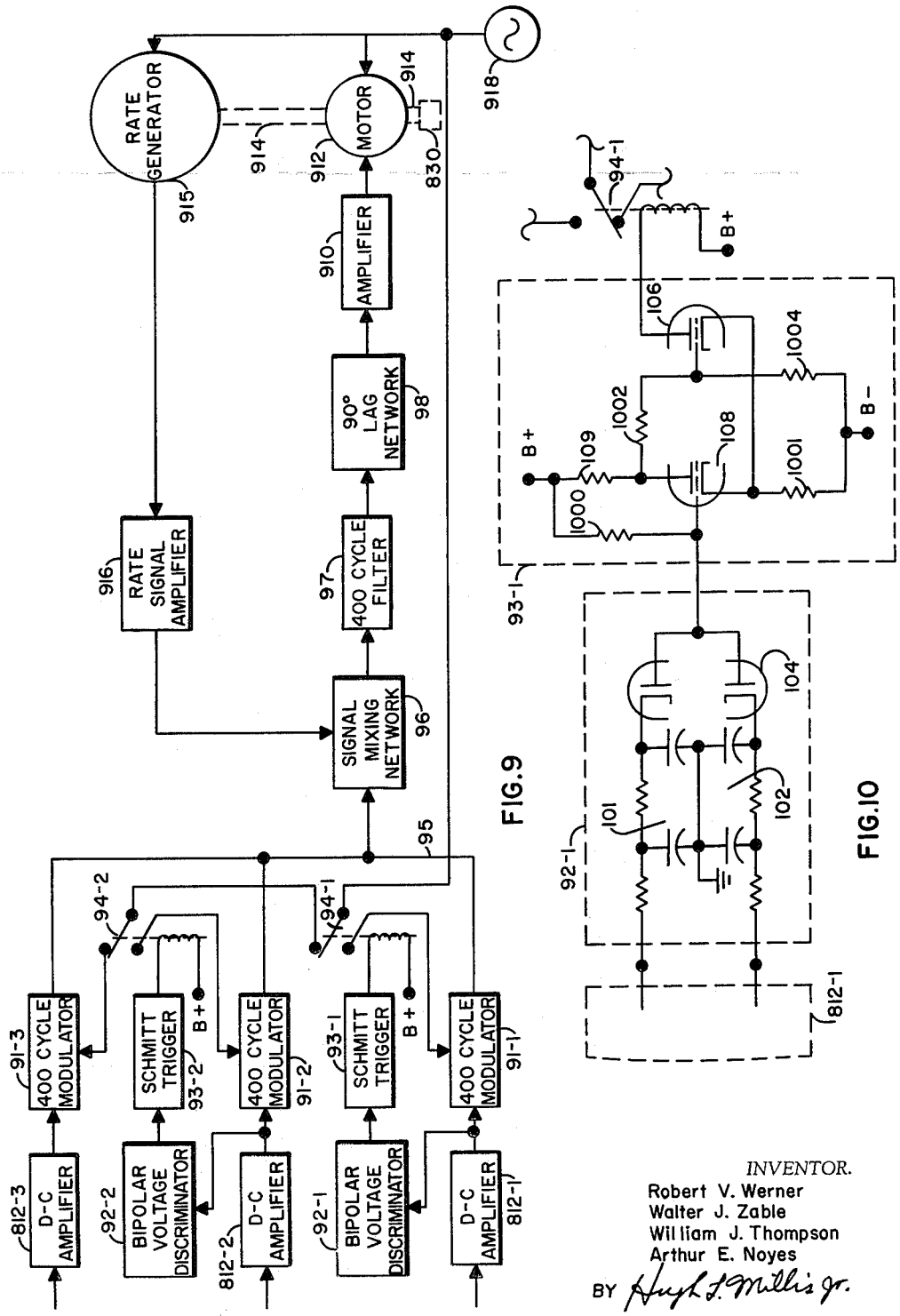

INVENTOR.
Robert V. Werner
Walter J. Zable
William J. Thompson
Arthur E. Noyes
BY Hugh L. Millis Jr.

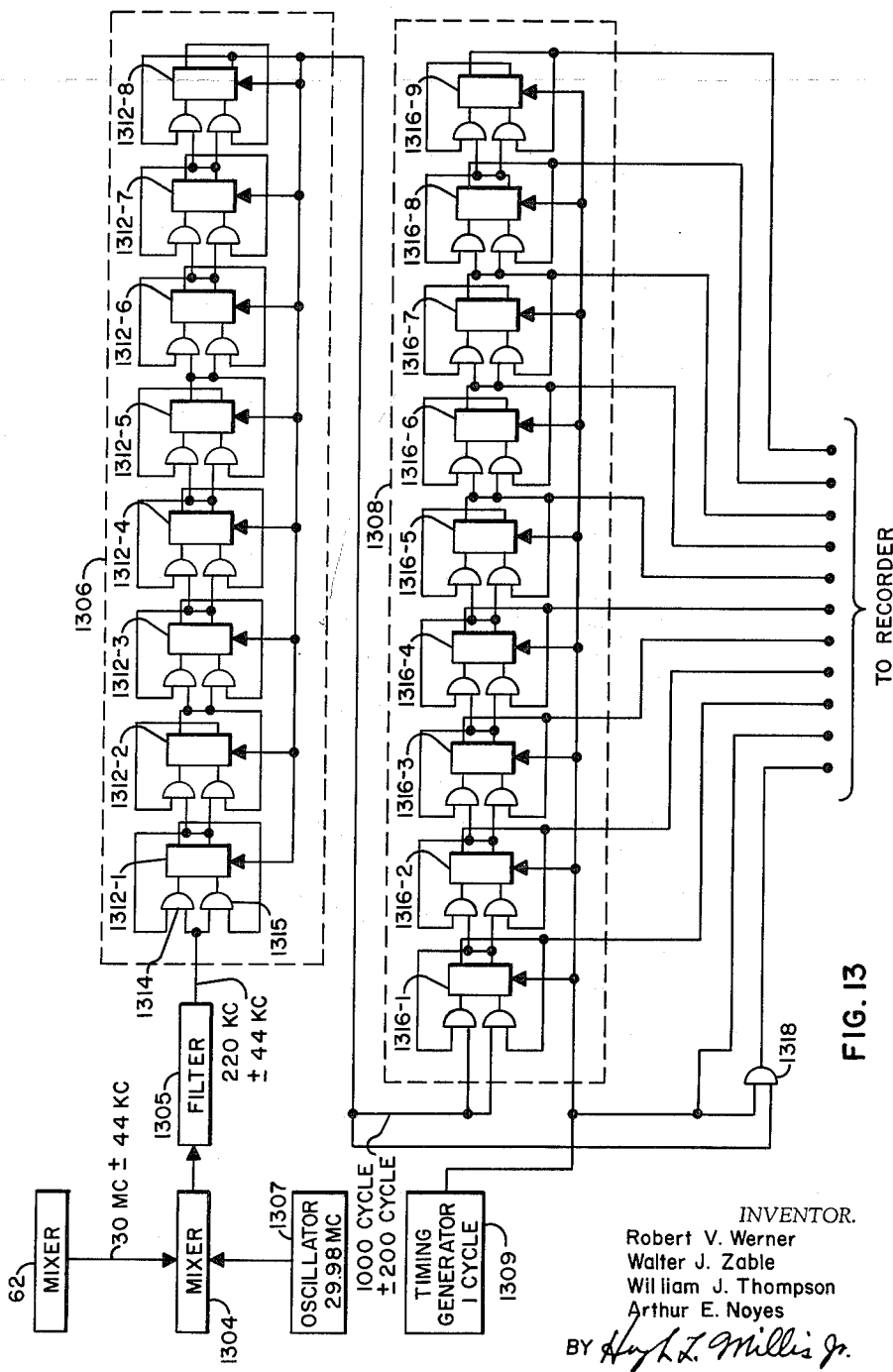

United States Patent Office 2,976,530
Patented Mar. 21, 1961

2,976,530

MULTIPLE-TARGET TRACKING SYSTEM

Robert V. Werner, La Mesa, and Walter J. Zable, William J. Thompson, and Arthur E. Noyes, San Diego, Calif., assignors to Cubic Corporation, San Diego, Calif., a corporation of California Filed Aug. 8, 1958, Ser. No. 754,099

17 Claims. (Cl. 343—112)

The present invention relates to a multiple-target tracking system, and, more particularly, to a pair of direction-measuring units capable of acquiring simultaneous flight-path information in spatial coordinate form of three airborne vehicles.

In a co-pending application for patent, entitled "Sequenced Spatial Coordinate Determining System" of Robert V. Werner, Walter J. Zable and William J. Thompson, Serial Number 737,446, and filed on May 23, 1958, a system was described which acquired continuous, highly-accurate flight-path information of a single airborne target vehicle. The system disclosed was based on the physical principle that the phase shift incurred between a ground-transmitted signal and a corresponding return signal, formed by receiving and retransmitting the ground signal by a target-carried transponder, yields scalar distance information of the target position. The disclosed system employed three of such scalar distance-measuring units and by incorporating a sequencing technique, the three ground stations were enabled to serially communicate with a single transponder in the target, and thereby obtain spatial coordinate flight-path information.

As was pointed out in that application, a number of inherent disadvantages and limitations existing in optical and radar tracking techniques, employed for similar tracking purposes, were elegantly overcome by the system therein disclosed. The significantly difficult problem of target acquisition was eliminated as was the unique optical tracking limitation of requiring satisfactory meteorological conditions for operability. Also, radar system accuracies were bettered by at least an order of a magnitude while the finest available optical systems were at least equalled in accuracy.

The system according to the present invention, although based on a different physical principle than was the system of the prior-noted application, possesses additional capabilities thereover while offering the same noted features and advantages over radar and optical tracking systems. In particular the system comprises a pair of similar ground-based stations, each capable of determining a unique direction vector pointing to each of three target vehicles, the two vectors directed to each target from the two respective ground systems being sufficient to locate the target in spatial coordinate form.

The three target vehicles carry three respective transmitter and antenna arrangements, each of which transmits a continuous signal for interception at the ground. The three signals thus transmitted are spaced in frequency at relatively close intervals. Each ground station consists of a pair of crossed-baseline antenna systems, each of the resulting four antenna baselines having three antenna pairs spaced from each other by 4.5λ, 5λ and 50λ wavelengths in distance, where the wavelength λ may correspond to the highest frequency signal transmitted by the three target vehicles. Now, the signal transmitted by each target intercepts each antenna pair with a phase difference corresponding to the difference in path length between its transmitter and the two antennas. This phase difference, in turn, corresponds to the direction cosine of the particular target position relative to the antenna pair in question. This phase information is preserved at each antenna pair by an associated receiver, which after two mixing operations produces a 1000-cycle output signal whose phase relationship with a standard 1000-cycle signal, initially employed in the mixing operation, corresponds exactly to the original phase difference existing in the signals received at the antenna pair from the target vehicle.

The need of employing three separate antenna pairs along each baseline arises from a basic systems requirement to achieve high accuracy, and, at the same time, avoid positional ambiguities. The 50λ antenna pair, for example, is capable of locating a target direction to a high degree of accuracy but, as will be later explained in detail, the information acquired therefrom is termed ambiguous, that is, the target may be located at any one of a number of different vector directions and its transmitted signal still experience the same phase shift at the stated antenna pair. On the other hand, λ/2 information, acquired by employing the difference between the phase information obtained at the 5λ and 4.5λ antenna pairs is completely unambiguous for all target positions, but lacks, to a considerable degree, the desired accuracy. Hence, λ/2 information is employed for ambiguity resolution, 50λ for accuracy, and finally, the 5λ antenna pair information is employed to resolve the ambiguities in the 50λ information, and itself, in turn, is resolved by the λ/2 information. The 5λ information is required since the λ/2 information, by itself, lacks sufficient accuracy to resolve the ambiguities, under all conditions, in the 50λ information.

Each of the four antenna baselines includes three servo readout units corresponding to the three targets. Each readout unit, in turn, includes three separate channels, corresponding to the effective λ/2, 5λ and 50λ antenna pair information and designated as Coarse, Intermediate and Fine, respectively, in accordance with the accuracy of their corresponding direction measuring abilities. Each channel includes a resolver whose shaft position determines the phase shift incurred between an applied signal and an output signal. Now, the difference between the 4.5λ and 5λ antenna signals, or λ/2, is taken across the Coarse channel resolver, while the 5λ and 50λ information signals are effectively applied across their respective channel resolvers. Whenever the shaft position of any channel resolver corresponds to the phase shift in its particular channel signal, null exists, and no significant output signal is produced by that channel.

The resolver shafts are coupled to a servo motor by a gear train at gear-down points corresponding to their respective channel wavelength ratios. The motor is energized selectively, and, in particular, is energized by the longest wavelength channel whose resolver shaft position is off of null by a predetermined, but small, amount. The energization is such as to drive the motor, and hence resolver shaft, through the gear train toward null and whenever the energizing channel resolver shaft error falls below a specified value, the next shorter wavelength channel is switched into controlling the motor energization. In this way, target tracking proceeds, and when all channel resolvers of a servo readout unit are at null, their shaft positions indicate the direction cosine measured from their associated antenna baseline to their corresponding target vehicle.

Output readings may be taken of the resolver shaft positions in a number of ways and three methods are presented in accordance with the present invention. A visual readout, comprising a series of scale and pointer arrangements, scaled and geared to the servo motor shaft to present direction cosine readings to 10 parts per million, is one readout technique. In another, a pair of digital shaft encoders are coupled to the gear train for presenting output binary digital information for entry into an associated digital computer for computational purposes. Finally, a potentiometer is coupled to the gear train and the analog signal derived from its shaft position is taken as a third type of output signal.

In the present system, four different factors occurs which potentially impose a substantial inaccuracy in the readout direction cosine values. The first factor is based on the requirement that the target vehicles must transmit different signal frequencies for avoiding obvious interference difficulties and hence, at most, only one signal wavelength can correspond to the antenna spacing employed in the two antenna baseline systems. This means, then, that the two remaining signal wavelengths cannot correspond to the antenna spacing and hence corrective information must be derived for application to the readout values obtained. As will be shown, the required correction is a proportionate one, that is, the direction cosine reading obtained must be multiplied by the ratio of the transmitted signal wavelength to the wavelength of the antenna spacing. The multiplication may, of course, be performed manually or by a computer, or the analog signal taken from the potentiometer coupled to each servo readout gear train may be initially corrected by merely applying a potential across its ends whose value, compared to the other target readout voltages, is proportional to the wavelength of the target signal being displayed.

Other factors requiring correction pertain to variations in the received signal wavelengths, which, of course, act to invalidate the specified constant relationship between transmitted signal wavelength and antenna spacing. The wavelength variations may be produced either by frequency drift in the target transmitter or Doppler effects caused by target movement. In addition, the target signal may have a slight offset from its desired value due to the engineering difficulty of securing an exactly predetermined frequency from a crystal-controlled oscillator. Information for correcting all three of these error-producing factors is obtained by determining, through digital techniques, average frequency taken over one-second sampling intervals. In particular, the received signal is effectively counted down during one-second intervals and the number remaining at the end of each one-second interval represents the average frequency transmitted by the target during the interval and hence may be used for correcting the direction cosine readings, again in a proportionate manner, obtained during the interval.

Accordingly, the system according to the present invention yields basic information of each of three target vehicle spatial coordinate positions to a high degree of accuracy owing to the physical principle upon which it is based, the manner of mechanizing the principle and the ability to acquire highly-accurate corrective information based on measuring each of the target received signal frequencies. As noted earlier, the present system embodies the same advantages over radar and optical tracking systems as did the system described in the previously noted co-pending application for patent, Serial No. 737,446, and contrasted with that system offers certain advantages thereover. For example, the ground stations are purely passive, require no transmitter or sequencing apparatus, and the target need carry only the most elementary transmitter as opposed to the reasonably elaborate transponder required in the previous system. Also, the present system requires only two ground stations as contrasted with three of the previous system and additionally has the capabilities of tracking a plurality of target vehicles, three being shown by way of example, while the preceding system was limited to tracking a single target vehicle.

It is, accordingly, the principal object of the present invention to provide a passive ground-based system capable of acquiring simultaneous spatial coordinate information of a plurality of airborne target vehicles.

Another object of the present invention is to provide an electronic system employing phase measuring techniques for acquiring spatial coordinate flight-path information of at least three target vehicles.

Still another object of the present invention is to provide an electronic system including four direction cosine measuring units arranged to derive simultaneous flight-path information of a plurality of airborne target vehicles.

A further object of the present invention is to provide a ground-based system having a pair of crossed-baseline antenna stations in which each system determines a direction vector to each of three target vehicles whereby spatial coordinate information is obtained of each of the three target vehicle positions.

Another object of the present invention is to provide an electronic system including a pair of crossed-baseline antenna stations which produces accurate tracking information of a target transmitting a first signal frequency, and employing the system for tracking a plurality of targets transmitting a plurality of different signal frequencies from the first frequency by producing corrective information based on the difference between each of said signal frequencies and the first signal frequency.

Another object of the present invention is to provide a pair of crossed-baseline antenna systems capable of deriving tracking information of a target vehicle transmitting a signal frequency corresponding to the antenna spacings employed in said pair of antenna systems, and additionally producing corrective information for the derived information based on frequency drifts in the target-transmitted signal.

Still another object of the present invention is to provide a ground-based system capable of producing tracking information of a plurality of airborne target vehicles and additionally producing corrective information based on frequency drifts in the target-transmitted signals and Doppler effects due to target velocity as received at the ground-based system.

A further object of the present invention is to provide an electronic system including a pair of crossed-baseline antenna stations, each of the antenna stations having a plurality of antenna pairs spaced according to a first frequency, the system being capable of providing tracking information of a plurality of airborne vehicles transmitting a plurality of signals differing from said first frequency, and additionally producing corrective information based on the difference between said first and each of said plurality of different transmitted signal frequencies.

A still further object of the present invention is to provide a ground-based system having a pair of crossed-baseline antenna systems including a number of antenna pairs spaced according to a first signal frequency and arranged to produce accurate tracking data of a target vehicle transmitting the first signal frequency and additionally producing tracking information and corrective information for the tracking information for other target vehicles which transmit different signal frequencies from the first signal.

Other objects, features and attendant advantages of the present invention will become more apparent to those skilled in the art as the following disclosure is set forth including a detailed description of a preferred embodiment of the invention as illustrated in the accompanying sheets of drawings in which:

Figure 3 is a schematic representation of the antenna pair placements in a single crossed-baseline antenna station;

Figure 4 is a functional block diagram showing the principal electronic units associated with a single antenna baseline;

Figure 6 is a block diagrammatic representation of a receiver unit in accordance with the present invention;

Figure 7 is a circuit diagram, partly in block diagrammatic form, of a typical receiver output circuit;

Figure 8 is a block diagrammatic representation of the first portion of a typical servo readout unit;

Figure 9 is a block diagrammatic presentation of the concluding portion of a servo readout unit;

Figure 10 is a detailed circuit diagram of a typical bipolar voltage discriminator and Schmitt trigger arrangement as found in a servo readout unit;

Figure 13 is a block diagrammatic showing of a digital data correction unit for use with each servo readout unit.

Figure 1:
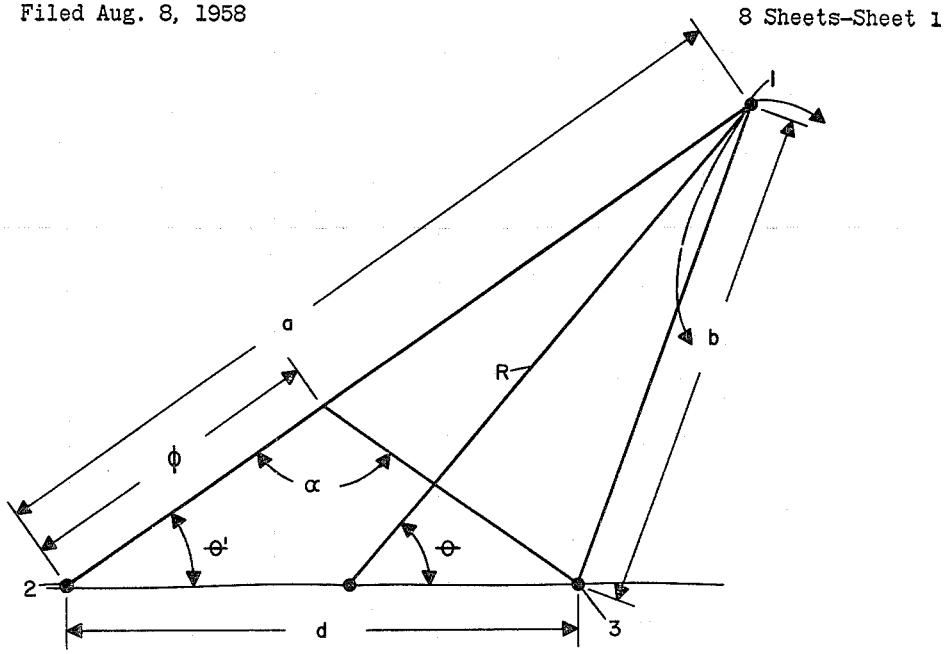
Figure 1 is a geometric representation for illustrating the physical principle employed by a single antenna pair in accordance with the present invention.

The physical principle upon which one aspect of the present invention is based is that the phase difference between a signal transmitted from a point source and received on a pair of spaced antennas is proportional to the direction cosine of the straight line joining the signal source to the center of the antenna baseline, assuming the baseline dimension to be much smaller than the slant range to the transmitting source. Referring now to the drawings, and in particular, Figure 1, there is illustrated a geometric drawing serving to illustrate this physical principle. In particular, the signal transmitter is located at point 1, and the two spaced antennas at 2 and 3. The antennas are spaced at a baseline distance designated $d$, and the transmitted signal from source 1 to antenna 2 travels a distance designated $a$ while the same signal travels a distance $b$ to antenna 3. The source at 1, is at a distance R from the mid-point of the antenna baseline. It is apparent that the phase difference, in wavelengths, between the signals received at stations 2 and 3 will be $$\phi = n\gamma = a - b \qquad (1)$$

where $\gamma$ is the carrier signal wavelength and $n$ is an integer representing the number of complete cycles of the carrier phase shift.

Assuming now that the distance R is significantly much greater than the antenna baseline, as originally specified, then $$\theta \approx \theta', \alpha \approx 90°$$

and $$\phi = d \cos \theta \qquad (2)$$

hence $$\cos \theta = \frac{\phi}{d} \qquad (3)$$

where $\theta$ is the angle of the line joining the signal source 1 to the center of the antenna baseline, as shown in the figure.

This means then, that a measurement of the phase difference between the signals arriving at the antennas will locate the signal source to lie along a direction cosine measured from the mid-point of the antenna baseline. Further consideration of this direction cosine will reveal that, with a single pair of antennas employed, the source may actually lie anywhere on essentially a conic section whose focus is located at the baseline mid-point and whose angle, measured relative to the axis of the section, is the arc cosine of the direction cosine angle. This may be observed from the drawing where it is readily apparent that if source 1 should be rotated along a constant R distance and angle $\theta$, toward and away from the observer, there will be no change in the phase difference between the signals received at the two antennas, that is, the phase difference will remain constant.

Assume now, instead of employing a single antenna pair, two of such pairs are used, positioned such that their baselines intersect at their respective mid-points and are directed at right angles to each other. With this antenna configuration, the two direction cosine conic surfaces, of the target position, measured at the respective antenna pairs, would intersect along a line; hence the signal source could therefore be located to the extent that it lay somewhere along the line formed by the intersection of the two conic surfaces. This means, then, that the source direction only can be determined by a crossed-baseline antenna pair.

Figure 2:
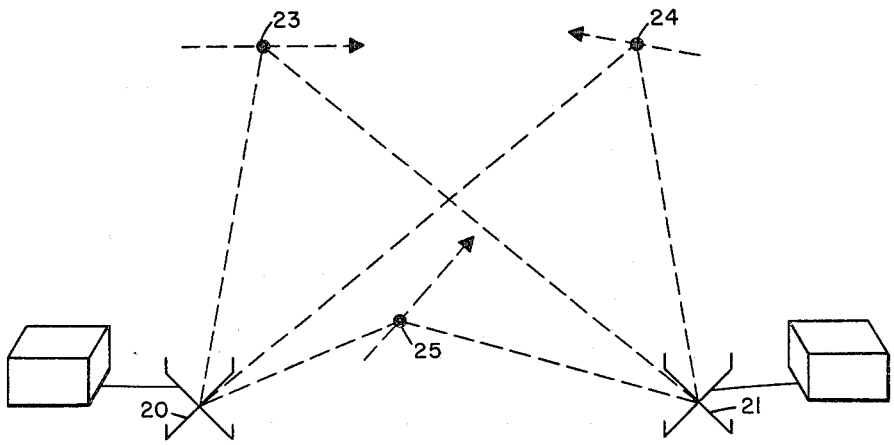
Figure 2 is a schematic representation of a pair of crossed-baseline antenna stations in conjunction with three airbone targets being tracked in accordance with the present invention.

Continuing the discussion of the physical principles upon which one aspect of the present invention is based, reference is made to Figure 2, in which is shown a pair of crossed-baseline antenna pairs, indicated at 20 and 21, both assumed located on the ground at a known distance apart. It is apparent that since each crossed-baseline system will locate a signal source to lie along a line, the intersecting lines from the two systems will locate the signal source to lie at a point in space, the spatial coordinates of which can be readily computed using the two directions so determined and the distance between the antenna systems. The function of the system according to the present invention, as stated earlier, is to simultaneously track a plurality of airborne target vehicles, three to be exact, each carrying a signal source, and produce continuous spatial coordinate information of the paths made by the three target vehicles. In Figure 2, points 23, 24 and 25 serve to illustrate schematically the three signal sources, each being located by a pair of direction vectors orientated from the two respective ground-based antenna systems.

Before reference is made to Figure 3, in which additional details of the present invention are set forth, it is necessary to establish certain basic characteristics of the phase-measuring technique employed, particularly the relationship between system accuracy capabilities, antenna spacings, and the frequencies of the transmitted signals whose phase shifts are to be measured. Assume, for example, considering Figure 1 again, that the wavelength of a transmitted signal is at least twice the distance $d$ between antennas 2 and 3. Stated differently, distance $d$ is not more than one-half the wavelength of the transmitted frequency. This means that, regardless of the source 1 position, the phase difference between its signal, separately received at antennas 2 and 3, can never exceed ½λ. In particular, the maximum value of phase difference obtainable, as will be readily appreciated, will occur when source 1 lies along an extended antenna baseline, that is, on either side of the antenna pair but along their baseline as lengthened. In this position, the transmitted signal will be first received by one antenna and then will experience an additional phase delay corresponding to the distance between the antennas before being received by the second antenna. The phase difference measurable at the antenna pair for all other source 1 positions, or directions to be more precise, will be less than λ/2, since from Figure 1, $a-b$, or $\phi$, will be less than $d$.

The importance of the foregoing remarks becomes clear when it is recalled that the cosine function over a λ/2 or 180-degree phase difference range, is single-valued, varying from +1 to −1 over the interval and hence has unique values for all phase difference angles. This means, then, that with an antenna spacing of at least λ/2, based on the source transmitted signal frequency, unique direction cosine values exist for all possible source directions.

Accordingly, in accordance with the present invention, an effective ½λ wavelength antenna spacing is employed along each baseline of each cross-baseline pair at stations 20 and 21, in Figure 2. This means, then, that four of such effective antenna pairs are used in the entire system. This ½λ wavelength may be based on the highest signal frequency as transmitted by sources 23, 24 or 25, or may be based on a still higher frequency in order to avoid any ambiguity problems. As will be shown later, corrective techniques must be employed to correct the output direction cosine reading obtained from each antenna pair spaced differently than an exact ½λ distance of the received signal. Thus, if the ½λ wavelength effective antenna pair is based on the frequency of the signal transmitted, say, by source 23, the readings obtained simultaneously from sources 24 and 25 must be corrected, the correction being a function of the amount of their respective frequency offsets from the signal frequency of source 23. Similarly, if an effective antenna spacing is employed which differs from all of the transmitted signal wavelengths, then all readings obtained must be corrected as a function of the amount of their respective frequency offsets.

As will be brought out in more detail later, the output direction cosine readings taken at each antenna pair are obtained through servo resolvers and, in accordance with the best practice in the servo resolver art, the highest accuracy obtainable in the phase difference measurement betweent he relatively long wavelength ½λ antenna signals is insufficient to meet system accuracy requirements primarily since resolver resolution properties limit accuracy to a percentage of the wavelength involved. Accordingly, to achieve the system accuracy desired, it is necessary to employ two additional antenna pairs for each baseline, the antenna pairs being spaced at respective distances equal to 5λ and 50λ where λ corresponds to the same wavelength employed for determining the effective ½λ antenna pair spacing.

In particular, the 50λ pair is employed for obtaining maximum system accuracy since small directional changes of a target will be reflected as relatively large cosine changes, particularly in comparison to corresponding changes induced in the ½λ direction cosine. However, as will be apparent, any measurements made by the 50λ antenna pair will be, as termed, ambiguous since the target may be in a substantially large number, one hundred to be exact, directions relative to the station and yield identical direction cosine numbers. This occurrence may be best understood by again considering, from Figure 1, a source located on an extended antenna baseline, where the antennas are assumed to be 50 wavelengths apart. Under this assumed condition, the signal will undergo 50 complete cycles of travel after receipt by the nearest antenna before pick-up by the furthest antenna. Under this assumed condition, a zero phase difference will be indicated and, in fact, occur regardless of which side of the antenna pair the source is assumed to lie on. Now, if the source is assumed to move upward, a direction will be reached when a phase difference of zero will again be read, but where the two paths from the source to the antenna pair differ by only 49λ or complete cycles. This condition also can exist on either side of the antenna pair. By continuing the example, it can be seen that one-hundred distinct ambiguities are present in any reading made at the 50λ antenna pair. However, as noted above, any such reading, although ambiguous, will present a resolver readout accuracy greatly exceeding that measurable in the resolver associated with the ½λ effective antenna pair.

The 5λ antenna pair is employed for resolving, up to its own ambiguity limitations, the ambiguities present in the 50λ data and effectively serves to bridge the difference between the highly-accurate 50λ information and the ½λ unambiguous but relatively inaccurate data. It is primarily required since the basic accuracy of the ½λ effective antenna pair reading is insufficient, particularly when fast-moving targets are encountered, to resolve by itself the 50λ ambiguities. The 5λ antenna pair data will contain 10 ambiguities, as will be appreciated by example from the previous description of the 50λ wavelength case, but will be sufficiently accurate to resolve the 50λ ambiguities, and yet its wavelength will be sufficiently long as to lie within the resolving capabilities of the ½λ antenna pair.

Referring now to Figure 3, there is shown a typical antenna pattern layout for a crossed-baseline station, such as stations 20 and 21 in Figure 2. The two sets of antennas are laid along a pair of baselines, indicated at X and Y in dotted form and directed at right angles to each other. In particular, the Y baseline includes antennas 30 and 31, at an indicated 50λ distance apart, each being symmetrically spaced about the X baseline by respective 25λ distances. Another pair of antennas 32 and 33, also symmetrically spaced about the X baseline, constitute the 5λ antenna pair while another pair of antennas 34 and 35 are spaced 4.5λ apart in the upper portion of the Y baseline. As will be explained in more detail later, it is not feasible to space an antenna pair at exactly λ/2 apart for acquiring the unambiguous reading, since the spacing, based on the actual frequencies used, is sufficiently small to produce a number of adverse electronic effects, primarily due to capacitive coupling and mutual loading between the antennas. Hence, an effective λ/2 antenna spacing is achieved by employing the signals received from the 4.5λ and 5λ antenna pairs and effectively taking their difference to thereby acquire information equivalent to a λ/2 antenna spacing.

The X baseline antenna layout is similar in all respects to the Y baseline layout and includes 50λ antennas 38 and 39 located symmetrically about the intersection of the X and Y baselines. The 5λ antenna pair is shown at 310 and 311 while the 4.5λ antenna pair is indicated at 312 and 313.

Each antenna may be of a ¼-wave monopole variety with an attached counterpoise of suitable type, and, for achieving optimum system accuracies, the entire antenna pattern field should be formed of a homogeneous earthen medium and carefully levelled. This will serve to minimize target signal reflections on the surrounding ground and their subsequent phase interaction with the signal received by the antenna directly from the target.

Referring now to Figure 4, there is shown in block schematic form, the electronic circuitry associated with a single antenna baseline, taken here by way of example to constitute the Y baseline shown in Figure 3. In the figure a 50λ receiver 40 is connected to the 50λ antenna pair 30 and 31 and corresponding receivers 41 and 42, of the 5λ and 4.5λ antenna pair, respectively, are connected to their associated antenna pairs 32 and 33, and 34 and 35, respectively. Also included is a double local oscillator 43 producing a 187-mc. output signal on an output signal line 45, a 187.001-mc. output signal on an output signal line 44, and a 1000-c.p.s., reference signal on a final output signal line 46. Oscillators 47, 48 and 49, producing highly-stable output signal frequencies of 40 mc., 42 and 44 mc., respectively, are also shown. The 187-mc. and 187.001-mc. signals from oscillator 43 are applied to each of receivers 40, 41 and 42. In the same way, the output signals of oscillators 47, 48 and 49 are also applied to each of the receivers.

In addition, a Target No. 1 servo readout 410, a Target No. 2 servo readout 411, and a Target No. 3 servo readout 412 are shown. Receiver 40 supplies a single output signal to each of the three servo readouts as do receivers 41 and 42. Also, the 1000-c.p.s. reference signal from double local oscillator 43 is applied to each of the three servo readouts. Finally, as indicated in the drawing, the three output signals of oscillator 43 and each of the signals of oscillators 47, 48 and 49 are applied to the corresponding receiver and target servo readout units within the X-baseline electronics, not herein shown.

Thus, a single crossed-baseline station will comprise six receivers and six servo readouts while the entire system, comprising two of such crossed-baseline systems, will have twice that number or twelve receivers and twelve servo readouts. Each station will have a single double local oscillator and three oscillators such as 47, 48 and 49 with the entire system including two double local oscillators and six of the oscillators. The detailed circuitry constituting double local oscillator 43 is shown in Figure 5, a typical receiver unit in Figures 6 and 7, and a typical servo readout unit in Figures 8 and 9, and reference is made to these figures and the descriptions presented in connection therewith for details of their specific operation.

Figure 5:
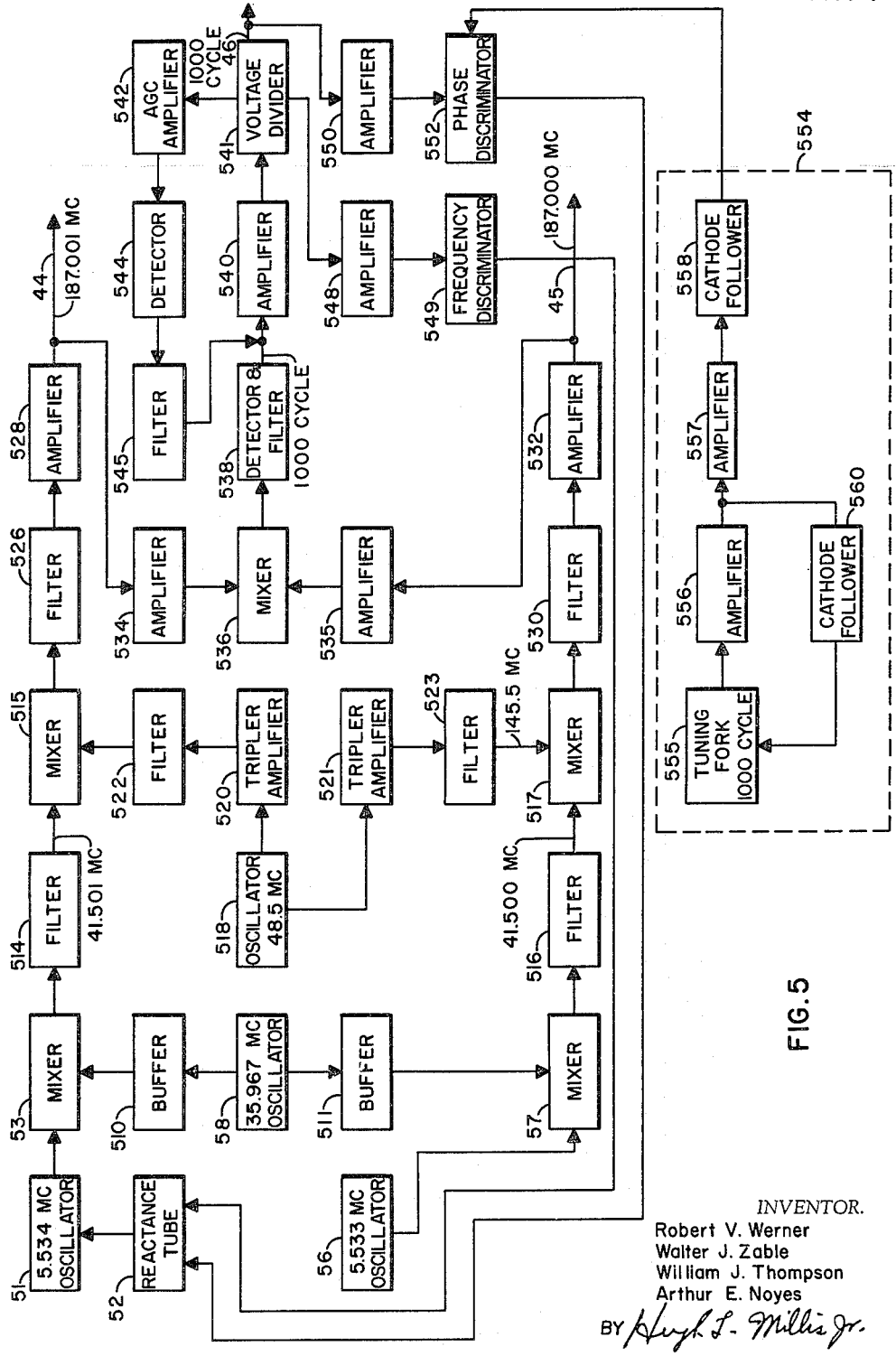
Figure 5 is a block diagrammatic representation of the double local oscillator employed at each crossed-baseline antenna station.

Double local oscillator 43 is illustrated in detailed block diagrammatic form in Figure 5. The output signal of an oscillator 51 is controlled by a reactance tube 52 to a frequency of 5.534 megacycles, and is applied to one input terminal of a mixer 53. A stabilized oscillator 58, preferably of the crystal-controlled variety, produces a constant 35.967-megacycle output signal which is applied through a buffer 510 to the other input terminal of mixer 53. Another stabilized oscillator 56, also preferably of the crystal-controlled variety and producing an output signal of a 5.533-megacycle frequency, is coupled to one input terminal of a mixer 57, the other input terminal of mixer 57 receiving the signal of oscillator 58 through buffer 511. The output signals of mixers 53 and 57 are applied through filters 514 and 516, respectively, to one input terminal of each of mixers 515 and 517, respectively. The output signal of another stabilized oscillator 518, again preferably frequency-controlled to operate at a constant 48.5-megacycle frequency, is applied to the input terminals of a pair of tripler amplifiers 520 and 521, whose output signals, in turn, are applied through filter circuits 522 and 523, respectively, to the other input terminals of mixers 515 and 517, respectively.

The output signal of mixer 515 is taken through a filter 526 and amplifier 528 to output line 44 of the double local oscillator. In the same way, the output signal of mixer 517 is taken through a filter 530 and amplifier 532 to the other output line 45 of the double local oscillator circuit. The pair of output signals appearing on lines 44 and 45 are amplified by amplifiers 534 and 535, respectively, and applied to the two input terminals of a mixer 536. The output signal of mixer 536 is applied serially through a detector and filter circuit 538, an amplifier 540, and a voltage divider 541 to output line 46.

An automatic gain control loop is taken from voltage divider 541 to the input of amplifier 540 through an AGC amplifier 542, a detector 544, and a filter 545, all serially connected. Another portion of the line 46 reference signal is tapped from voltage divider 541 and applied serially through an amplifier 548 and frequency discriminator 549 to one input terminal of reactance tube 52. Also, this signal from line 46 is taken through an amplifier 550 and applied to one input terminal of a phase discriminator 552. The other input terminal of phase discriminator 552 receives a standard 1000-cycle signal coming from a 1000-cycle standard section blocked in at 554.

Standard section 554 includes a tuning fork 555 whose output signal is applied serially through a compensating amplifier 556, amplifier 557 and cathode follower 558 to constitute the output signal of the standard section. A cathode follower circuit 560 is coupled between the output terminal of compensating amplifier 556 and a feedback terminal of tuning fork 555. Finally, the output signal from phase discriminator 552 is applied to another input terminal of reactance tube 52 to thereby complete the frequency control loop.

Consider now the operation of the double local oscillator as set forth in Figure 5, and, in particular, consider first the operation of that portion of the circuitry between oscillator 56 and output line 45 carrying the 187.000-mc. signal. Mixer 57 combines the 5.533-megacycle output signal of oscillator 56 and the 35.967-megacycle output signal of oscillator 58. The sum, only, of these two frequencies, or 41.5 mc., is passed by filter 516. Tripler amplifier 521 may be operated as a Class C or overdriven amplifier which acts to highly distort the output signal from oscillator 518. Filter 523 is tuned to pass the third harmonic of the originating oscillator 518 frequency of 48.5 megacycles, or 145.4 megacycles. The combination of this 145.5-megacycle signal from filter 523 with the 41,500-megacycle output frequency signal from filter 516 are combined in mixer 517 and filter 530 serves to pass their sum frequency of 187.000 megacycles, and filter out the other mixing components. Finally, amplifier 532 power amplifies the signal from filter 530 for application to output line 45. It may be noted at this point that the exact frequency produced by oscillator 518, in turn, determining the frequency base of the two output signals, is immaterial so long as it remains reasonably stable during an operational run. This is true, since, as will be later understood, it is the stability and accuracy of the 1000-cycle difference between the two output signals on lines 44 and 45 which enable the desired accuracy to be maintained by the system and not their absolute frequency base.

The operation of that portion of the circuit between oscillator 51 and output line 44 is identical to the circuitry just described except that the output signal on line 44 will be 1-kilocycle higher, or 187.000 megacycles. The remaining portion of the circuitry shown is to maintain this 1-kilocycle difference, through reactance tube 52, and also produce a 1000-cycle reference signal corresponding exactly in phase and frequency to the 1000-cycle frequency difference. This is accomplished by mixing the two output signals on lines 44 and 45 in mixer 36 and detecting and filtering their difference frequency of 1000 cycles through detector and filter circuit 538. Amplifier 540 amplifies the detected and filtered signal while various levels of the output signal are taken from voltage divider circuit 541 as required for the phase and frequency discriminator circuits, the automatic gain control circuit, and the 1000-cycle reference signal on output line 46. Voltage divider 541 may, for example, comprise a cathode follower circuit with a tapped resistor in its cathode circuit.

The automatic gain control loop coupled between divider 541 and the input terminal of amplifier 540 functions in conventional fashion to maintain the output signal level on line 46 at a constant, predetermined level in order to provide constant level signals for the phase and frequency discriminator circuits and the various servo readout units coupled to line 46.

Frequency discriminator 549 circuit, coupled between the output line and reactance tube 52, acts, upon any frequency deviation from the specified 1000-c.p.s. output frequency difference, to vary the reactance of tube 52 to thereby control the output signal frequency of oscillator 51 to the 1000-c.p.s. value. Phase discriminator 552 operates in substantially the same way by varying the reactance of reactance tube 52 to maintain an exact phase-lock between the 1000-c.p.s. reference signal on line 46 and the output signal from the standard 1000-c.p.s. section 554, as derived from its included tuning fork. In this way, then, the phase and frequency difference between the two signals on output lines 45 and 44 are maintained both locked in frequency and phase with the standard 1000-c.p.s. signal coming from section 554.

As stated previously, all of receivers 40, 41 and 42 of Figure 4 are similar, as are the corresponding receivers along the other baselines. In Figure 6 is disclosed, in block diagrammatic form, receiver 40, taken by way of example, as associated with the 50γ antennas 30 and 31. In particular, antenna 30 is connected to the input terminal of an R.-F. amplifier 61 whose output signal is applied to one input terminal of a mixer 62. The other antenna 31 is connected to the input terminal of an R.-F. amplifier 64, whose output terminal, in turn, is coupled to one input terminal of another mixer 65, corresponding to mixer 62. The other input terminals of mixers 62 and 65 receive the respective 187.000-megacycle signal on line 45 from oscillator 43 and the 187.001-megacycle signal on line 44 from oscillator 43.

The output signals of mixers 62 and 65 are added in an adder circuit 66 whose output signal, in turn, is applied to the input terminals of each of I.-F. amplifiers 610, 611 and 612, tuned to frequencies of 30 megacycles, 32 megacycles, and 34 megacycles, respectively. The output signals of I.-F. amplifiers 610, 611 and 612 are applied to one input terminal of each of mixers 614, 615 and 616, respectively, the other input terminals of mixers 614, 615 and 616 being coupled to the output signal lines of oscillators 47, 48 and 49, respectively, producing respective output signals, as before noted in Figure 4, of 40, 42 and 44 megacycles, respectively. The output signals from mixers 614, 615 and 616 are applied to the input terminals of output circuits 620, 621 and 622, respectively. The output terminals of output circuits 620, 621 and 622, go to the Target No. 1 servo readout, Target No. 2 servo readout, and the Target No. 3 servo readout, respectively, as shown earlier in block diagrammatic form in Figure 4. The output circuits are all identical and one is shown, in further detail by way of example, in Figure 7.

In considering the operation of a typical receiver, as shown in Figure 6, it will be recalled that the signals transmitted by the three target vehicles differ in frequency and, for the purposes of example, are assigned 217, 219 and 221 megacycles. These signals will be simultaneously received at each of antennas 30 and 31 and the phase difference of each signal at each antenna pair will depend on the direction cosine between the baseline midpoint and its corresponding target, bearing in mind the ambiguity characteristics of all signals received by the 50γ antenna pair. The same is likewise true for the antenna pairs 32 nad 33, and 34 and 35, in Figure 3, as well as all corresponding antenna pairs in the other antenna baselines of the present system.

Amplifiers 61 and 64 serve to amplify the received signals at their respective antennas 30 and 31. These R.-F. amplifiers are preferably located in the field at the base of their respective antennas to minimize noise and phase drift problems which would arise in attempting to couple the low level R.-F. power received on the antennas to a remote location. Each amplifier is preferably designed to possess a high degree of phase shift stability, since any differing phase shifts occurring between the respective signals passing through the receivers will yield erroneous direction cosine information.

Mixers 62 and 65 act in conventional fashion to combine their two applied signal frequencies and producing, in this case, their frequency difference. For example, the 187-mc. signal from oscillator 43 is combined with the 217-mc. signal from Target Vehicle No. 1 and a 30-mc. frequency difference produced. In the same way, frequency differences of 32 mc. and 34 mc. are also produced by mixer 62 corresponding to the 219- and 221-mc. signal frequencies from Targets No. 2 and 3, respectively. In the same way, the output line of mixer 65 contains a 30.001-mc. signal corresponding to the mixing action between the 217-mc. signal received by antenna 31 and the 187.001-mc. signal on line 44 from oscillator 43. Also, mixer 65 produces 32.001-mc. and 34.001-mc. signals corresponding to the received 219- and 221-mc. signals, respectively. Thus, the output signals from mixer 65 correspond to these produced by mixer 62 except that each is 1-kc. higher owing to the 1-kc. higher frequency signal appearing on line 44 from oscillator 43.

Adder 66 serves to linearly combine the signals appearing on the two output lines of mixers 62 and 65 and each of I.-F. amplifiers 610, 611 and 612 serves to selectively amplify one of the output signal pairs from adder 66 while rejecting the other two. For example, amplifier 610 is tuned to 30 megacycles and hence will pass the 30-mc. and the 30.001-mc. signals from adder 66 and reject the other two signal pairs. In the same way, amplifier 611 and 612 will selectively pass the 32-mc. and 34-mc. signals, respectively. It is thus seen that these three I.-F. amplifiers are employed to separate the target derived signals into corresponding signal channels.

A second mixing action is performed in each channel by the use of mixers 614, 615 and 616 in conjunction with oscillators 47, 48 and 49, respectively. The frequency difference between the oscillator signal and the I.-F. amplifier output signal in each channel is 10 megacycles; hence, the output signals supplied to the respective output circuits are of 10.000 megacycles and 9.999 megacycles, as derived from the respective mixing actions.

The three output circuits shown in block diagrammatic form in Figure 6 are similar in all respects, and reference is made now to Figure 7, which illustrates a typical output circuit in detail. In particular, the output signal of the mixer in its corresponding channel is applied to the input of a multi-stage I.-F. amplifier 70 whose output signal, in turn, is fed through a single-stage I.-F. amplifier 71. A first feedback path for regulating the amplification of I.-F. amplifier 70 is taken through a detector 72 from the output of I.-F. amplifier 71 and a second path is taken serially from detector 72 through a cathode follower circuit 73, a 1000-cycle amplifier 74 across a voltage level adjusting network indicated at 75, through a diode 76 into an automatic gain control amplifier 77. The output terminal of output 77 is shunted to ground by a diode and capacitor combination 78 and is serially connected to the first feedback path through a diode 710. The output signal of cathode follower 73 constitutes the output signal of the output circuit and is fed, as stated previously, to a corresponding servo readout unit, as shown later in Figures 8 and 9.

In operation, the multi-stage output amplifier 70 and single-stage I.-F. amplifier 71 are tuned to the 10-megacycle region of the desired 10.000-mc. and 9.999-mc. signals from the mixer in its associated channel to thereby eliminate undesired mixing components obtained by the mixing operation. Detector 72, which may, for example, be a single diode, serves to detect the frequency difference of 1000 kc. in the two signals from the mixer and this 1000-kc. signal is transmitted to the servo readout unit through cathode follower 73. Amplifier 74, is tuned to the 1000-cycle signal frequency from follower 73 for amplifying its level and restricting the noise passed by detector 72. Voltage adjusting network 75 acts to set the threshold level of the AGC loop gain and, whenever the output signal amplitude from amplifier 74 exceeds the bias setting of the divider network and the front turn-over resistance of diode 76, a 1000-cycle signal is applied to amplifier 77; an amplified 1000-cycle accordingly dumped across shunt-connected diode and capacitor combination 78 where it is rectified and stored as a D.-C. level on the condenser. The condenser in this case acts as an integrating circuit to maintain an average bias based on the I.-F. signal strength, thereby smoothing out fluctuations in the I.-F. strip gain. Whenever the signal stored on the capacitor attains the turn-over voltage point of back-connected diode 710, the excess voltage signal is fed to the multi-stage I.-F. amplifier block 70 and acts, in the manner well-known in the art, to restrict its gain. Single-stage I.-F. amplifier 71 is not included in the automatic gain control loop in order to prevent limiting of the first I.-F. stage by the feedback signal.

The feedback circuit from detector 72 to the multi-stage amplifier 70 gives an instantaneous automatic gain control action based on the R.-F. signal strength being passed through the circuit. It is particularly useful in the absence of the 1000-cycle signal component, in which case it acts on the noise present to reduce the gain of amplifier 70 and thereby prevents saturation of the servo channel by the noise component.

Referring now to Figure 8, there is shown the first portion of a typical servo readout unit, such as indicated at 410, 411 or 412 in Figure 4. In the figure, the 4.5λ input signal from the 4.5λ receiver, for example, receiver 42 in Figure 4, is taken serially through an amplifier 80-1, a 1000-c.p.s. filter 81-1, a cathode follower 82-1 and an amplifier 84 to the rotor windings of a resolver, indicated schematically at 85. The input signal line from the 5λ receiver is connected to the input terminal of an amplifier 80-2, whose output signal is passed through a 1000-c.p.s. filter 81-2 and a cathode follower 82-2 to the input terminals of a pair of discriminator driver amplifiers 810 and 811. A resistor and capacitor are serially-coupled across the two stator windings of resolver 85, and the common junction of the resistor and capacitor is connected to the input terminal of a discriminator driver amplifier 86.

The 1000-c.p.s. reference signal, coming from double local oscillator 43, not again shown, is taken through a series-connected amplifier 814, a 1000-c.p.s. filter 815, and a cathode follower 816 to the respective input terminals of a phase-splitting network 818 and an amplifier 819. The output signal of amplifier 819 is applied across the rotor windings of a resolver 820, whose stator windings are connected to the input terminals of a discriminator driver amplifier 821 in the manner described for resolver 85. The two output signals from phase-splitting network 818 are applied to the input terminals of a pair of amplifiers 822 and 823, respectively, whose output signals are applied across the two respective stator windings of another resolver 824. The rotor windings of resolver 824 are connected between ground and the input terminal of a discriminator driver amplifier 826. Finally, the input signal coming from the 50λ receiver is taken serially through an amplifier 80-3, a 1000-c.p.s. filter 81-3 and a cathode follower 82-3 to the input terminal of a discriminator driver amplifier 827.

The output signals of discriminator driver amplifiers 86 and 811 are applied to the two respective input terminals of a phase discriminator 87-1, whose output terminal, in turn, is coupled to the input terminal of a D.-C. amplifier 812-1. The output signals of discriminator driver amplifiers 810 and 821 are applied to the two input terminals of a phase discriminator 87-2, whose output signal, in turn, is applied to the input terminal of a D.-C. amplifier 812-2. The output signals of discriminator driver amplifiers 826 and 827 are coupled to the two input terminals of a phase discriminator 87-3, whose output signal is applied to the input terminal of a D.-C. amplifier 812-3. Finally, the shafts of resolvers 85, 820 and 824 are connected at suitable gear-down points, whose ratios will be given later in Figure 11, to a gear train indicated at 830 and driven by a servo motor to be later shown in Figure 9.

Before describing in detail the operation of the circuit of Figure 8, reference is now made to Figure 9, in which is shown the concluding portion of a typical servo readout unit. Again illustrated are the three D.-C. amplifiers 812-1 through 812-3. The output signal of amplifier 812-1 is applied to one input terminal of a 400-cycle modulator 91-1 and to the input terminal of a bipolar voltage discriminator 92-1. The output signal of voltage discriminator 92-1 is applied to the input terminal of a Schmitt trigger 93-1, whose output signal is applied across the energizing coil of a relay shown at 94-1. The lower contact point of relay 94-1 is coupled to the other input terminal of modulator 91-1 and the output signal of this modulator is applied to a common modulator line 95.

The output terminal of amplifier 812-2 is connected to the input terminal of a bipolar voltage discriminator 92-2 and one input terminal of a 400-cycle modulator 91-2. A Schmitt trigger 93-2 is driven by discriminator 92-2 and its output signal is applied across the energizing coil of a relay 94-2. The movable arm of relay 94-2 is connected to the upper contact point of relay 94-1 while its lower contact point is coupled to the other input terminal of modulator 91-2. The upper contact point of relay 94-2 is connected to one input terminal of a 400-c.p.s. modulator 91-3, which receives on its other input terminal the output signal of D.-C. amplifier 812-3. The output signals of modulators 91-2 and 91-3 are applied to the common modulator line 95.

Line 95 is connected to one input terminal of a signal mixing network 96 whose output signal, in turn, is serially coupled through a 400-c.p.s. filter 97, a 90-degree lag network 98, and an amplifier 910 to one stator winding of a 400-cycle two-phase motor indicated at 912. A source of alternating current potential of 400 cycles, for example, in frequency, is indicated at 918 and this 400-cycle signal is applied to the movable arm of relay 94-1 and to the other stator winding of motor 912. The shaft 914 of motor 912 is connected to a rate generator 915, which receives the 400-cycle output signal of source 918 and produces an output signal which is fed through a rate signal amplifier 916 to the other input terminal of signal mixing network 96. Shaft 914 of motor 912 also drives a gear train, indicated at 830, which serves to drive the various resolver shafts, as shown previously in Figure 8, and some output indicators, such as pointers, potentiometers and encoders, as shown later in Figure 11.

Consider now the operation of the typical servo readout of Figures 8 and 9. First of all, it will be recalled that the output signal from each of the receiver output circuits is 1000-c.p.s. in frequency. This frequency was derived in each case by employing the basic technique of beating two 1000-c.p.s. offset signal frequencies from double local oscillator 43 with the respective received signals from each antenna pair. After another mixing operation, the 1000-c.p.s. frequency difference between the antenna pair signals was detected and the receiver 1000-c.p.s. output signal produced. As will be recalled, the original 1000-c.p.s. difference or offset between the two double local oscillator signals is phase- and frequency-locked with the 1000-c.p.s. reference signal produced by the oscillator and supplied to the various target servo readouts. Now, it can be shown mathematically that the phase difference existing between the 1000-c.p.s. output signal from each receiver output circuit and the reference 1000-c.p.s. signal from the oscillator corresponds identically to the phase difference existing between the R.-F. signals received on the associated antenna pair as transmitted by a particular target of interest. Thus, the phase relationships between the 1000-c.p.s. reference and the respective 1000-c.p.s. signals appearing on the 4.5λ, 5λ and 50λ receiver input lines to the servo unit correspond exactly to the phast differences of the target-transmitted signal appearing on the 4.5λ antenna pair, the 5λ antenna pair and the 50λ antenna pair, respectively.

The basic function of the servo unit is to employ the 5λ and 4.5λ signals to secure an effective ½λ wavelength signal, use this resulting information to resolve all system direction cosine ambiguities, and then utilize the 5λ and 50λ receiver signals for establishing highly-accurate target directional cosine information. This is accomplished, in brief, by employing three major information channels, corresponding to the respective λ/2, 5λ and 50λ wavelength information. Each channel includes a resolver and all resolvers are driven by a motor 912 through gear train 830 at a series of speed-reduced points whose ratios correspond to the series of channel wavelength ratios. Thus, the 5λ channel resolver is driven at 1/10 the speed of the 50λ channel, or, stated differently, the 50λ resolver shaft will be driven 10 complete revolutions for each single revolution made by the 5λ resolver shaft, and the 5λ resolver will be driven 10 revolutions for each revolution made by the ½λ channel resolver, etc. The 50λ and 5λ information signals are effectively compared, phase-wise, with the 1000-c.p.s. reference signal through the resolvers of their respective channels, while the difference between the 4.5λ and 5λ data signals are taken in the λ/2 channel, with the subsequent acquisition of λ/2 wavelength information.

Then, still continuing this brief description of the basic servo operation, the motor is driven until all resolver outputs are at null, at which time the resolver shaft displacements in the channels correspond to the phase differences between each of their respective compared signal pairs. At this point, then, a measurement or indication of the motor shaft displacement gives direction cosine information of the target corresponding to the particular readout. The motor energization toward null is selective, and comes from the channel of the longest wavelength whose resolver shaft position exhibits a predetermined amount of error. Switching between channels is automatically performed to fulfill this stated function.

In considering now the detailed manner of operation of the servo unit, consider first of all the operation of the motor drive circuitry shown in Figure 9. In a manner to be later shown, modulator common line 95 will either contain a 400-cycle signal exactly in phase with the 400-cycle signal produced by source 918, a 400-cycle signal 180-degrees out of phase with the signal from source 918, or no signal. The no signal case indicates that the motor shaft position is at null, that is, its position corresponds exactly to the direction cosine of the target vehicle. An in-phase 400-cycle signal denotes that the shaft position of the resolver in the particular channel being activated is off of null in one direction while the 180-degree phase difference 400-cycle signal indicates an off-null condition in the reverse direction. The amplitude of this line 95 signal, in turn, is determined by the amount or magnitude of the off-null resolver shaft position.

In any event, the particular signal appearing on modulator common line 95 is routed through a mixing network 96 which combines a feedback signal with it, the feedback signal being employed, as will be shortly explained, to provide proportional motor control. Four-hundred-cycle filter 97 serves to eliminate any 1000-c.p.s. information signal passed by the various channel modulator circuits to line 95. Network 98, which may, for example, comprise a single inductor, acts to shift the phase of the 400-cycle signal passed by filter 97 by 90 degrees, and amplifier 910 amplifies the phase-shifted signal and applies it to one of the stator windings of motor 912.

Motor 912, as stated previously, is preferably of the two-phase servo variety, and as such will have two stator windings wound at 90 degrees apart. A quadrature relationship between the signals applied to its stator windings is required for achieving motor shaft rotation. In particular, the motor shaft of motor 912 will be driven in one direction by an in-phase signal from modulator line 95 as phase-shifted by network 98 and will, on the other hand, be driven in the opposite direction for the corresponding 180-degree phase difference signal from line 95. The torque applied to the motor by either of these signals will be a function of their amplitude which will correspond, as stated previously, to the amount of error in the particular channel furnishing control to the motor circuitry.

Finally, rate generator 915 will pass an output 400-cycle signal from source 918, whose phase will depend on the direction of its shaft rotation and whose amplitude will be proportional to its velocity. This signal, in being coupled back to the motor driving circuitry through rate amplifier 916 and signal mixing network 96, will act in a degenerative manner to provide proportional motor control. Thus, motor operation will be stabilized and excessive hunting or overshoots prevented whenever, for example, a target is either initially acquired or changes its velocity.

Having established the operation of the motor and its associated drive circuitry, consider Figure 8 again, and particularly the λ/2 wavelength channel portion employing the 5λ and 4.5λ input signals. The 4.5λ input signal, of 1000 c.p.s., is applied across the rotor windings of resolver 85 and thereby serves as the reference frequency. Resolver 85 is connected to form a linear phase-shifter, that is, the capacitive reactance of the capacitor at 1000 cycles, connected serially with the resistor across its stator windings, equals the resistor value. Hence, each angular degree of rotation of the resolver rotor shaft causes a phase shift of one degree (1°) in the resolver output signal as applied to one input terminal of phase discriminator 87–1. The 5λ signal, after suitable amplification and filtering, is applied to the other input terminal of phase discriminator 87–1 and, an output D.-C. signal is produced whenever the two applied input signal phases are not in exact quadrature relationship. This, in turn, will occur whenever the shaft of resolver 85 does not correspond to the phase shift between the 5λ and 4.5λ input signals. Actually, since phase discriminator 87–1 is of the balanced modulator type, it will contain two output leads and a push-pull type of D.-C. output signal will appear on the two leads. In particular, positive and negative D.-C. signals will be produced on the two respective leads for one direction of an off-null resolver shaft position, and corresponding negative and positive D.-C. signals will be produced for the opposite direction of off-null shaft position. Also, the magnitude of the D.-C. signal produced will be a direct function of the magnitude of the resolver shaft position away from null. The signal from discriminator 87–1 will actually represent λ/2 wavelength information, as can be shown mathematically, since the connections employed, including the servoing action, effectively take the difference between the 4.5λ and 5λ input signals, or λ/2 wavelength.

Considering now the 5λ channel, resolver 820 is connected similarly to resolver 85, but the 1000-cycle reference signal is applied to its rotor windings. Phase discriminator 87–2 produces an output signal based on the phase difference between the 5λ input signal and the 1000-cycle reference signal as phase shifted through resolver 820. In the way described previously for the λ/2 channel, the push-pull type of signal from discriminator 87–2 may be of one or the other polarity pair in accordance with the difference in phase between its two input signals, while no output signal will be produced when the shaft position of resolver 820 is such as to give a quadrature phase relationship between the discriminator 87–2 input signals.

The Fine or 50λ channel resolver 824 connections differ from the previous resolver connections in that the stator and rotor roles are effectively reversed. This is done to enable system accuracy to be maintained when moving targets are being tracked, which, of course, will normally be the case. In particular, the change of phase produced by a fast-moving target in the 50λ antenna channel is sufficiently great to be reflected as an actual frequency change in the normal 1000-cycle receiver output circuit signal. This frequency may be either slightly higher or lower, by a few cycles, depending upon the particular direction of target movement relative to the antenna pair. Under this condition, if the shaft of resolver 824 were stationary, two signals of slightly different frequency would be applied to the input terminals of phase discriminator 87–3, with their difference frequency accordingly appearing on its pair of output lines. The actual response of the circuit will be, under this condition, to drive the resolver shaft of resolver 824 at a velocity to compensate for this frequency difference. For example, if the input signal on the 50λ line were 998 cycles per second, owing to the effect of target velocity, resolver shaft 832–3 would be driven in the proper direction, at 2 revolutions or cycles per second so that the signal impressed on phase discriminator 87–3 from the resolver would have the same frequency as the input signal, or 998 cycles per second. The particular resolver connections employed for resolver 824 produce no output phase error when its shaft is rotated. On the other hand, the linear phase shift network coupled across the stator windings of resolvers 820 and 85 will produce phasing errors upon rotation of their respective shafts. Such an error, however, will not affect the over-all system accuracy, since such system accuracy, as noted previously, resides in the Fine or 50λ channel.

The remaining portion of the servo readout section to be explained in detail deals with the selection circuitry which serves to energize motor 912 in accordance with the longest wavelength channel having a predetermined amount of error, in turn, measured by the D.-C. amplifier output signal amplitudes. Although detailed circuit diagrams of a typical bipolar voltage discriminator and Schmitt trigger are given in Figure 10, it may be stated here that each discriminator, fed from the two lines of its associated D.-C. push-pull amplifier will, in effect, examine the signal magnitudes appearing on its input lines and apply the more negative of the two to the single input terminal of its associated Schmitt trigger circuit. The Schmitt trigger circuit, in turn, is arranged to trigger, that is, apply energizing current to its associated relay coil whenever its single input signal level falls to a predetermined negative value.

In particular, this predetermined value corresponds, for the Coarse or λ/2 channel, to a 16-degree error in its associated resolver shaft position and, in the same way, Schmitt trigger 93–2 will be activated whenever a 16-degree error exists in the Intermediate or 5λ channel. On the other hand, both Schmitt triggers are arranged to have considerable electronic hysteresis, equivalent to mechanical backlash, in that they will not switch back to their de-energized condition until the input signal level corresponds to a 9-degree error of their respective resolver shaft positions. The reason for this will be made clear shortly.

The channel switching arrangement, employing Schmitt triggers 93–1 and 93–2, is relatively straightforward. Whenever the Coarse channel resolver position error exceeds 16 degrees, Schmitt trigger 93–1 will trigger, the relay coil of relay 94–1 will be energized and its movable switch arm will engage the lower contact point thereby applying the 400-cycle signal from source 918 to the other input terminal of 400-cycle modulator 91–1. Under this condition, modulator common line 95 will have the 400-cycle output signal of modulator 91–1 on it, the phase and magnitude of which, in turn, will be based on the polarity and magnitude, respectively, of the D.-C. amplifier 812–1 output signal. During this interval, then, motor 912 will be energized by the error signal coming from the resolver of the Coarse channel until the error, as stated previously, is less than 9 degrees, at which time Schmitt trigger 93–1 will trigger back to the de-energized condition, and the movable arm of relay 94–1 will return to its upper contact position.

Since a 9-degree resolver error in the λ/2 channel corresponds to a 90-degree resolver error in the 5λ channel, owing to the 10:1 gearing ratio therebetween, Schmitt trigger 93–2 will have already been triggered prior to the retriggering of Schmitt trigger 93–1, and the movable arm of relay 94–2 will be engaged with its lower contact point. Thus, upon the release of relay 94–1, the 400-cycle signal from source 918 will be conducted through the movable arm of relay 94–2 to the other input terminal of 400-cycle modulator 91–2, and its output signal applied to modulator common line 95. Hence, motor 912 will, during this interval, be energized by the error signal appearing in the 5λ channel and, as stated before, when a shaft position error of 9 degrees is attained by resolver 820, Schmitt trigger 93–2 will be de-energized and the movable arm of relay 94–2 will return to its upper contact position and apply the 400-cycle signal from source 918 to the other input terminal of 400-cycle modulator 91–3. When this occurs, the Fine channel resolver error will be passed to modulator common line 95 and control the motor energization.

The final detail requiring explanation in the servo readout operation is the reason for employing electronic hysteresis, that is, different pull-in and drop-out levels, in the Schmitt trigger circuit. This feature is needed to prevent ground multi-path propagation from affecting the ambiguity resolving abilities of the Coarse and Intermediate channels. Multi-path propagation is caused by the target-transmitted signals reflecting off of the surrounding ground level and hitting the antenna pairs with a phase differing from the signals received directly from the target. Since multi-path propagation is random in nature, its effect on the three different antenna pairs will differ at any time and not be predictable in advance. It has been established, however, through field tests that these random effects may occasionally causes momentary phase errors exceeding 9 degrees in the Coarse and Intermediate channels but always less than 16 degrees. Thus, if control lies in the Fine channel, the occurrence of a multi-path propagation error through either the Coarse or Intermediate channels, since it will be smaller than 16 degrees, will not alter the Schmitt trigger conduction state with an ensuing erroneous servo unit operation. On the other hand, for true errors, that is, of 16 degrees or more, in either the Coarse or Intermediate channels as the case may be, the corresponding Schmitt trigger will be actuated and the channel properly regain control on the basis of the true error, hence maintaining the ambiguity resolving properties originally specified.

Referring now to Figure 10, there is shown a detailed circuit diagram of bipolar voltage discriminator 92–1 and Schmitt trigger 93–1, the Coarse channel, taken as representative of similar units in the Intermediate channel and other servo readouts. In the figure, one output lead of push-pull D.-C. amplifier 812–1 is taken through an R.-C. filter network 101 to the cathode of one section of a twin diode indicated at 104. The other lead from amplifier 812–1 is taken through a similar R.-C. filter network 102 to the cathode of the other diode section of twin diode 104. The two anodes of diode 104 are connected together and their common junction is coupled to Schmitt trigger 93–1, and, in particular, to the grid of a first twin triode section 108, included therein. The anode of section 108 is coupled to the terminal of a source of positive potential, indicated at B+ through a resistor 109, and its grid is also coupled to the B+ terminal through a resistor 1000. The cathode of the first section is coupled through a cathode resistor 1001 to the terminal of a source of negative potential, indicated at B−.

The grid terminal of the second triode section at 106 is connected to the anode terminal of the first section through a resistor 1002 and to the B− terminal through a resistor 1004. Its cathode is connected in parallel to the cathode of the first section and the anode of this second section is coupled through the energizing coil of relay 94–1 to the B+ terminal, again shown for the purpose of clarity.

The two filter circuits 101 and 102 act to smooth out the D.-C. potential levels impressed on their respective input conductors from D.-C. amplifier 812–1. The two sections of dual diode 104 are connected similarly to a digital computer type of "or" circuit in that their common anode junction point will exhibit the lower potential of the two incoming signal levels from D.-C. amplifier 812–1. As an example, if the signal passed by filter 101 were more negative than the filter 102 signal, the signal appearing at the anode of the upper twin diode section would be at substantially the passed signal voltage level, the forward voltage drop across the diode section being negligible. Since this passed potential is of a lower magnitude, as specified above, than the filter 102 signal, the lower half diode section will be back-biased and its input signal will hence be effectively isolated from the input of Schmitt trigger 93–1.

Schmitt trigger 93–1 operates in the conventional well-known manner in that triode section 108 will normally be fully conducting owing to the application of positive potential from the B+ terminal through resistor 1000 to its grid. With section 108 conducting, section 106 will be at cut-off owing to the relatively low and high potentials at the section 108 plate and grid, respectively, with the result that no plate current flow, through the relay, takes place. When, however, a predetermined level of negative potential is passed through discriminator 92–1, the grid potential of triode section 108 will be reduced to the point that full current flow through the section no longer takes place. When this situation occurs, the relative grid and cathode potentials of section 106 will be adjusted to the point that a slight current conduction through section 106 takes place and there then follows a rapid triggering action since this slight conduction will draw current through common cathode resistor 1001, in turn, acting to cut off section 108 still further, etc.

The retriggering point, that is, the point where the circuit will trigger back to its initially-assumed condition, will occur when the lower of the two input signals from D.-C. amplifier 812–1 is at a sufficiently high potential level to cause triode section 108 to begin conduction again. The magnitude of the retriggering potential required, which will be higher than the triggering potential, is governed by the value of resistor 1001, the higher the resistor value, the more positive the signal level requirements, etc. It is, accordingly, the value of this resistor which governs the amount of electrical hysteresis in the circuit, the need for which has been presented earlier.

Figure 11:
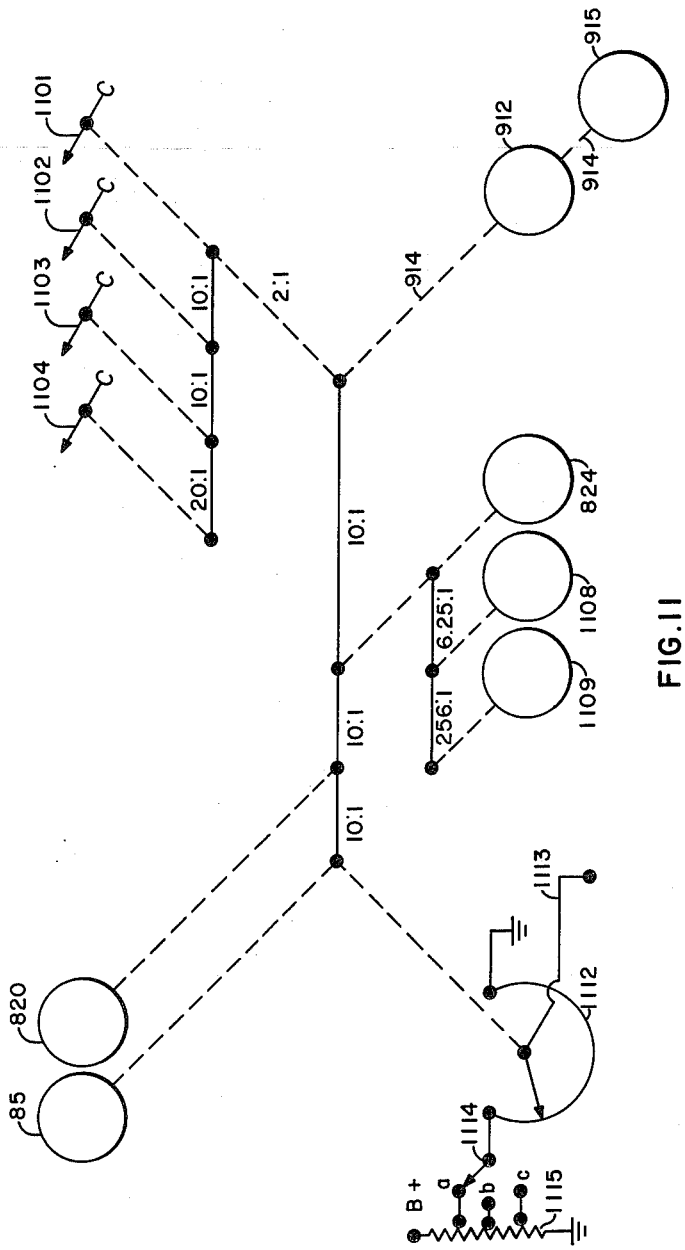
Figure 11 shows in schematic fashion, the gear ratios and data pick-offs of a servo readout unit gear train.

Referring now to Figure 11, there is shown in more detail the motor driven gear train, as indicated previously in schematic fashion at 830 in Figure 8, including, in addition, visual, analog and digital readout apparatus. Again illustrated schematically is servo motor 912, shaft 914, and rate generator 915. Shaft 914, after being geared up by a 2:1 ratio, drives a pointer 1101 followed, after appropriate gearing, by a series of pointers indicated at 1102, 1103, and 1104, each pointer being associated with an appropriate scale, not herein illustrated. In particular, pointer 1102 is scaled down by a 10:1 gear ratio from the pointer 1101 shaft, and pointers 1103 and 1104 are scaled down by 10:1 and 20:1 gear ratios, respectively, from the respective shafts of pointers 1102 and 1103.

The Fine or 50λ channel resolver 824 is coupled to the gear train at a 10:1 step-down from the motor shaft 914 connection. The shaft of the Intermediate channel resolver 820 is coupled to the gear train at a 10:1 gear-down ratio point from the resolver 824 shaft connection, while the shaft of the Coarse channel resolver 85 is coupled to the gear train at a 10:1 step-down point from the resolver 820 shaft connection. A pair of digital encoders, illustrated schematically at 1108 and 1109, are coupled, after appropriate gear-downs, to the Fine channel resolver 824 shaft. In particular, the shaft of encoder 1108 is geared down 6.25:1 from the resolver 824 shaft while encoder 1109 is geared down by 256:1 from the shaft of encoder 1108.

Finally, the movable arm of a potentiometer 1112 is coupled to the gear train at a point corresponding to the resolver 85 shaft connection. One end of the potentiometer resistive element is connected to ground while the other end is connected to the movable arm of a three-position switch 1114. The three contact points, designated a, b and c, of switch 1114 are connected to corresponding points along a tapped resistor 1115, the ends of which are connected between a source of positive potential, as at B+, and ground. An output lead 1113 is taken from the movable arm of potentiometer 1112.

Considering first the pointer and scale arrangements, if the motor shaft is scaled, relative to the first resolver shaft, such that each single motor shaft rotation equals .002 cosine in value, then owing to the 2:1 gear-up between motor shaft 914 and pointer 1101, one complete revolution of pointer 1101 would represent a cosine value of .001. Stated differently, shaft 914 would be driven one complete revolution for each target direction change of .002 cosine in value, while pointer 1101 would make one revolution for each target direction change of .001. The scale associated with pointer 1101 could, for example, be marked off in ten units, each representing a cosine value of .0001, and, by interpolating each of these divisions to one part in ten, say, the final reading given by the pointer and scale would be to a resolution of .00001, or 10 parts per million of the target cosine direction.

Pointer 1102, in being scaled down by a factor of ten from pointer 1101, would represent .01 cosine per revolution and could also have its associated scale divided into ten units, each unit, in turn, equalling one complete revolution of pointer 1101 or .001 cosine in value. In the corresponding manner, each complete revolution of pointer 1103 would represent a .1 cosine value change while the final pointer 1104, owing to its 20:1 gear-down could be arranged with a cosine scale which contained twenty divisions, ten for the cosine value range from +1 to 0, and ten for 0 to −1.

The digital encoders indicated schematically at 1108 and 1109 are provided to yield a system readout of both high accuracy and resolution in binary number form. Each of the encoder arrangements, for example, may be similar to the optical-mechanical type as represented by the Adcon RD–13, as manufactured by the Adcon Corporation, Boston, Massachusetts. Each of such encoders produces, upon the appearance of a command signal from a computing or conversion source, not herein illustrated, a binary-coded number whose value corresponds to the angular position of its respective shaft. As will be appreciated by those skilled in the art, the digital information so derived from the pair of encoders may be directly recorded on magnetic tape, or after being modified into a proper format by suitable conversion devices, be applied as input information to a general-purpose computer which would act to compute the various target paths based on data secured from all of the system readout units.

If a digital resolution of 5 parts per million readout is needed for computational purposes, each cosine value must be divided into $2^{18}$ increments, that is, 18 binary input bits. Since, however, the direction cosine values range from −1 to +1, an encoder capacity of 19 bits is necessary to cover the full range. The particular Adcon RD–13 encoders noted above as being suitable for use as encoders 1108 and 1109 contain only 13 bits each; hence, all 13 places of encoder 1109 may be employed with only 6 of the most significant digits of encoder 1108 being thereby utilized. This, of course, assumes that negligible backlash occurs in the gearing between the two encoder shafts.

Up to this point in the discussion of the system according to the present invention, no detailed mention has been made of the implications involved in transmitting signal frequencies from the target vehicles which differ from the exact antenna spacing, even though it is apparent that at least two of the three transmitted signals must fall into this category. Pursuing this important aspect of the present invention, consider again Equation 3, as given previously:

$$\cos \theta = \frac{\phi}{d} \qquad (3)$$

This equation states, mathematically, that the direction cosine is equal to the phase difference between the pair of received signals in cycles divided by the antenna spacing. For the case of the effective λ/2 spacing, Equation 3 reduces to:

$$\cos \theta = 2\phi \qquad (4)$$

On the other hand, where λ and $d$ are not integrally related, unlike the assumption in Equation 4 above, it is nevertheless apparent that a direct, proportional relationship exists between signal wavelength and antenna spacing, and it is this simple relationship that enables an easy correction to be made for all readings obtained by a servo readout employed for a target-transmitted offset frequency. For example, if the wavelength of the transmitted signal frequency were 10% longer than the antenna baseline, $d$, then the cosine $\theta$ reading need only be increased by 10%, or multiplied by 1.1, to obtain the correct value.

Hence, only knowledge of the amount of frequency offset or signal wavelength and the antenna spacing in wavelengths is required to correct any readout value. Thus, in Figure 11, the indicated readings taken at the series of pointer and scale arrangements would be multiplied, continuing the above example, by 1.1 to obtain the correct cosine direction reading. Such a correction, of course, may be performed manually, or the reading obtained from the pointers entered into a computer and the multiplication performed thereby. In the same way, the binary digital readings of encoders 1108 and 1109 may be entered into any specified general-purpose computer and a correction multiplication made in the course of the target position calculations.

Spatial coordinate information of each target vehicle path may be obtained by taking a series of readings at each of its four corresponding readout units, one at each antenna baseline, and performing a series of trigonometric calculations to combine the four direction cosines into a desired or specified ground based coordinate system. Quite obviously, no details are herein presented for the calculations involved, since a computer would, in actual practice, be employed, and the detailed description of a computer to perform such a task would not serve to clarify any of the principles involved in the present system. It is apparent, however, that sufficient information of each target vehicle's path is present at its corresponding series of readout units and the actual calculations involved in presenting this information in any specified coordinate system is only a detail capable of being performed in a wide variety of ways.

An analog output signal corrected for frequency offset is obtained from the output lead 1113 of potentiometer 1112. In particular, the tapped resistor points $a$, $b$ and $c$ correspond to the three target-transmitted frequencies and the movable switch arm of each readout unit will be thrown to engage the tapped point corresponding to its particular target frequency. Now, the taps are so spaced along resistor 1115 that the ratios of the respective voltages applied to potentiometer 1112 correspond exactly to the ratios of their respective signal frequency wavelengths. Hence, the signal magnitude appearing on output lead 1113 of each readout will correspond to its target's direction cosine as corrected for frequency offset in its transmitted signal. The analog signals thus obtained may be fed to a recorder for recording purposes, or to an analog computer, along with corresponding target signals from the other associated readout units for computing the spatial coordinate position of the corresponding target vehicle. It will, of course, be appreciated that the accuracy of such analog computations will be considerably less than the actual accuracy inherent in the system.

Figure 12:
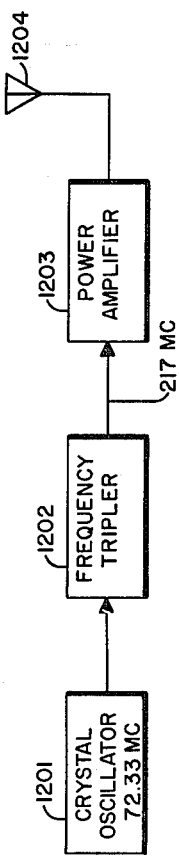
Fig. 12 shows, in block diagrammatic form, a typical target vehicle transmitter.

Referring now to Figure 12, there is illustrated a typical transmitter carried by a target vehicle for producing the signals received by the various antenna pairs in the ground-based system. In particular, it includes a frequency stabilized, crystal-controlled oscillator 1201 whose output signal is fed through a frequency tripler 1202 to the input terminal of a power amplifier 1203. The output signal from the power amplifier is fed to an antenna indicated at 1204 for transmission to the ground.

In particular, if the particular transmitter shown is carried by Target No. 1, then its oscillator produces an output signal frequency of 72.33 megacycles which, after the frequency tripling operation by tripler 1202 appears as a 217-megacycle signal which is power amplified and transmitted to the ground from the antenna. Although, as will be later appreciated, high frequency stability is not here necessarily a system requirement, since corrective means are employed on the ground to compensate for frequency drifts; nevertheless, a measure of frequency stability of oscillator 1201 is desirable in order to permit full frequency deviation from all possible causes to occur without exceeding the capabilities of the correction system.

A digital unit for producing data correction information based on the frequency drift of a target-transmitted signal is illustrated in Figure 13. One of such units is employed for each of the three targets, and as such, may be located at any receiver associated with any antenna pair. The particular unit illustrated, is shown in conjunction with the receiver of Figure 6 and, in particular, is adapted to produce frequency drift or slight frequency offset information on the Target No. 1 transmitted signal frequency assumed to be 217 megacycles.

In particular, the output signal of 29.98 megacycles of a stabilized oscillator 1302 is applied to one input terminal of a mixer 1304. The output signal of mixer 62, previously illustrated in Figure 6, is applied to the other input terminal of mixer 1304 and the output signal of mixer 1304 is applied serially through a filter 1305 to the input terminal of a frequency divider, indicated in block 1306, and comprising a series of eight serially-connected flip-flops 1312-1, 1312-2, etc., through flip-flop 1312-8.

The output from divider 1306 is applied to the input of a readout counter shown in block 1308 and comprising a series of nine serially-connected flip-flops as at 1316-1, 1316-2, etc., through 1316-9. A one-cycle timing signal produced by timing generator 1309 is applied to a common flip-flop reset line within readout counter 1308 and also to one input terminal of an "and" gate circuit, indicated schematically at 1318. The output signal of divider 1306 is applied to the other input terminal of gate circuit 1318 and the output signal of gate 1318, along with the output signal of timing generator 1309 and the conduction state signals of each of the flip-flops within readout counter 1308 are indicated as going to a recorder unit, not herein illustrated.

Before proceeding with a detailed operational description of the frequency correction circuitry of Figure 13, it is first necessary to discuss another type of error present at the antenna pair other than the error caused by the previously-described offset frequency, on the order of magnitude of several megacycles, and employed to prevent signal interference difficulties from arising between the three target-transmitted signals. The correction employed for such an error was based, as will be recalled, on the expectation of receiving a constant, known frequency at the antenna pairs whose wavelength merely differed from the assumed antenna spacings of 50λ, 5λ and 4.5λ. In actual practice, however, several factors occur which act to invalidate this previous assumption. First of all, a real difficulty exists in cutting a crystal to a desired thickness, placing it in a circuit, and having the circuit's output frequency exactly correspond, say, to within a few parts per million, to the originally-specified or desired frequency. Accordingly, normal engineering practice dictates that some leeway should be expected in the frequencies transmitted by the targets, and the amount of this offset will be subject to variations but should be within a hundred parts or so per million from each of the specified 217-, 219- and 221-mc. signal frequencies. In the second place, the target transmitter experiences a random frequency drift during the course of its operation, the amount of drift being up to, for example, a maximum of approximately 10 parts per million. In the third place, the target motion, if sufficiently high and in the proper direction, will introduce the so-called Doppler effect in its carrier signal as received at the antenna pairs and the resulting received signal frequency will be higher or lower than the actual transmitted signal depending on the target's motion relative to the antenna pairs.

All of these errors, transmitter drift, slight offset, and Doppler, will behave identically to the offset frequency case in that the antenna spacings will no longer exactly correspond to the transmitted signal wavelength. Accordingly, the servo readout values must be corrected proportionally with the frequency change. It is, accordingly, the primary purpose of the Figure 13 circuitry to provide corrective information based on frequency deviations in the received signal, and, in particular, frequency deviations from those frequencies earlier assumed in Figure 6 as being transmitted from the three target vehicles. Assuming, now, that a frequency drift up to approximately 200 parts per million, positive or negative, is to be compensated for, then the 30-megacycle output signal from mixer 62, as originally derived in Figure 6 by mixing the 187-megacycle signal from double local oscillator 43 with the incoming signal of 217 megacycles from Target No. 1, will be 30 megacycles ±44 kc. This signal when mixed with the 29.98-megacycle signal frequency of oscillator 1302 will yield an output signal of 220 kc. with a variation of ±44 kc., assuming the difference signal frequency resulting from the mixing operation is passed by filter 1305.

Divider 1306, comprising, as stated before, eight flip-flops, is connected to divide down this signal frequency by a factor of 220. Considering now, for the moment, divider 1306 in detail, each of its flip-flops is preceded by a pair of "and" gating circuits whose output terminals are connected to the respective flip-flop input terminals. The flip-flops are cross-coupled, that is, the lower output terminal is connected to one input of the upper "and" circuit while the upper output terminal is connected to one input terminal of the lower "and" circuit. In accordance with conventional flip-flop terminology, a signal applied through the upper "and" circuit will trigger the flip-flop to a conduction state such that the signal appearing on its upper output conductor goes to a relatively high voltage level, and the signal appearing on its lower output conductor goes to a relatively low voltage level. Upon the application of a pulse to the lower input terminal, the previously-described conduction state is reversed, that is, the upper and lower output conductor signals go to relatively low and high voltage levels, respectively.

Now, as will be appreciated by those skilled in the art, numerous detailed circuit embodiments and configurations have been developed in the flip-flop art. It is assumed here, by way of example only, that each flip-flop will trigger upon receipt of a positive-going signal on either of its input terminals and, further, will be "reset" or triggered to its zero condition upon receipt of a positive pulse on the lead, entering, as shown, its bottom edge. All of these terminals are connected to a common line, in turn coupled to the lower output terminal of the final flip-flop 1312-8, within the divider.

In considering the interconnections between the flip-flops within the divider, it will be seen that all flip-flops except 1312-2 and 1312-5 have their lower output terminal connected to the other input terminal of each of the two "and" gating circuits associated with the next following flip-flop. Flip-flops 1312-2 and 1312-5, on the other hand, have their upper output conductor connected to the other input terminals of each of the "and" gates of their respective following flip-flops.

In operation, assume that a reset pulse has just occurred and that all flip-flops are initially at their zero or reset state. The input signal from filter 1305, which is preferably shaped to a square-wave configuration at the filter output by a diode clamping action, for example, will cause the first stage flip-flop 1312-1, because of its cross-coupled connections, to alternately trigger between its "one" and "zero" conditions, each input signal cycle effecting one triggering operation. Now, if all flip-flops were connected to each other as are the first two, the final flip-flop 1312-8 would be triggered from its "on" to "off" state, with the signal appearing on its lower output conductor going from a low to high voltage level, every 256 cycles in the input signal.

However, as noted earlier, the output leads of flip-flops 1312-2 and 1312-5 are reversed from the normal connections and each of these lead reversals acts to effectively reduce the number of input cycles until overflow occurs by an amount corresponding to the binary digit value of its particular flip-flop. This is true since a reversal of a flip-flop output lead is identical to setting the flip-flop to "one" upon the divider overflow which, of course, would also act to reduce the number of counts before overflow by the values represented by the "set" flip-flop. Thus, since the second and fifth flip-flops correspond to the $2^2$ and $2^5$ values, respectively, or 4 and 32, respectively, their sum is 36 which, when subtracted from 256 yields 220, or the desired division. Hence, divider 1306 will produce a positive-going output signal for every 220 input cycles received from filter 1305. The frequency of the output signal will hence be the input signal frequency, 220 kc. ± 44 kc., divided by 220, or 1000 cycles ± 200 cycles.

Readout counter 1308 is nine flip-flop stages long and hence, if all stages were connected similarly to the first two, overflow would occur after each receipt of 1024 input pulses. However, the output leads of flip-flops 1316-5, 1316-6 and 1316-7, are reversed from normal in their connections to the next following flip-flop, and hence their respective values of $2^5$, $2^6$ and $2^7$, or 32, 64 and 128 which, when added together yield 224, cause counter 1308 to count up to 1024−224, or 800 cycles, before overflow.

Timing generator 1309 produces a positive-going pulse once each second which will reset all the flip-flops in counter 1308 to their reset or zero states. Thus, if the input frequency from divider 1306 were at the minimum of the established value of range, that is, at 800 cycles, it is apparent that during the one-second interval marked by the timing generator 1309 signal, readout counter 1308 would cycle up to and overflow and hence contain a zero count at the appearance of the timing signal.

On the other hand, if there was no frequency deviation in the received signal, with the incoming signal from divider 1306 accordingly being at its normal value of 1000 cycles, then, during the one-second interval marked by the output signal of generator 1309, an excess of 200 counts would be accumulated in counter 1308 beyond its normal overflow point of 800 counts. Hence, an output reading of 200 counts would indicate no frequency error, while the previously-given example of a zero count, corresponding to a divider signal frequency of 800 cycles, would indicate a frequency error of −200 parts per million. In the same way, the highest value in the established range, assumed to be 1200 cycles, would cause an excess of 400 counts to appear in counter 1308 at the end of the timing interval and the magnitude of this count would thereby represent a frequency error of +200 parts per million. The above examples are given below in tabular form.

| Divider Frequency, c.p.s. | Registered Count | Frequency Error, p.p.m. |
|---|---|---|
| 800 | 0 | −200 |
| 1,000 | 200 | 0 |
| 1,200 | 400 | +200 |

As is seen in the drawing, the upper output signals of all flip-flops in the readout counter are taken out for application to a recorder, not herein specifically illustrated. Also, the timing and divider output signals are applied to "and" circuit 1318, whose output signal, in turn, will be high or "on" if an input signal to the readout counter appears simultaneously with one-cycle signal from the timing generator. If this "and" signal is "on" an indication is thereby transmitted to the recorder to indicate that the recording made that interval of the readout conduction states is meaningless since carry digits will be in the process of propagating through the series of counter flip-flops.

In concluding the present description, it will be appreciated that the system herein described is not limited to tracking only three target vehicles, but by properly employing the principles described, may be readily expanded to include the capability of tracking any reasonable number of target vehicles. In such an extension, it will be understood that the transmitters in the added target vehicles must transmit different carrier signal frequencies from each other and the original vehicles, as previously described. Such an expanded system must also include an additional servo readout unit with each antenna baseline for each additional target and the receiver associated with each antenna pair must include an additional I-F channel for each additional target. These additional receiver channel output signals would, in the manner described, be applied to their corresponding additional target servo readout units. Error correction for target frequency offsets would be performed in the manner described by coupling a potentiometer to each gear train of the added servo readout units, and tapped at a point corresponding to the amount of frequency offset of its associated target vehicle carrier signal. Also, additional digital correction units would be employed for each new target readout unit to furnish digital correction data based on Doppler or target transmitter frequency drifts.

It will also be apparent that in the entire system shown and described, numerous modifications and changes may be incorporated in the particular arrangement of circuits and still accomplish the over-all system functions as set forth, without involving invention. It is also apparent that each of the circuits shown in block diagrammatic form, may take any one of many recognized forms, as known in the art and described in numerous reference and technical books, magazines, etc., without the employment of invention.

It will be appreciated, of course, by those skilled in the art, that the foregoing disclosure relates only to a detailed preferred embodiment of the invention whose spirit and scope of the invention is set forth in the appended claims.

What is claimed is:

1. In combination: first and second electronic direction-measuring stations, each of said stations being responsive to the receipt of a signal for determining first and second direction vector information, respectively, to the source of the received signal said first and second direction vector information being accurate only when said received signal is of a first frequency; a vehicle transmitting a signal of a second frequency whereby the first and second direction vector information determined by said first and second stations, respectively, to said vehicle is erroneous; and means for producing corrective information for the first and second direction vector information produced at said first and second stations, respectively, based on the difference between said first and second frequencies.

2. The combination according to claim 1 including, in addition, means for producing corrective information on said first and second direction vector information in accordance with changes in the second frequency as received at said first and second electronic direction-measuring stations.

3. In combination: a series of signal sources transmitting a series of different signal frequencies, respectively; an electronic system for receiving the series of signals transmitted by said series of signal sources and producing spatial coordinate information of the positions of each of said series of signal sources, the spatial coordinate information produced by said electronic system being accurate only for a received signal of one predetermined frequency; and a plurality of first corrective information producing means associated with said electronic system for producing first corrective information for the positions of each of the signal sources whose signal frequency differs from said one predetermined frequency.

4. The claim according to claim 3 including, in addition, a plurality of second corrective information producing means associated with said electronic system for producing second corrective information for the positions of each of the signal sources based on changes in its signal frequency as received at said electronic system, each of said signal frequency changes being due to frequency drift and motion of its respective signal source.

5. An electronic system for producing tracking information of a target vehicle transmitting a signal of a first wavelength, said system comprising: a pair of antennas spaced according to a second wavelength and receiving the signal transmitted by the target vehicle, the phase difference between the signals received at said pair of antennas being a function of the direction cosine of the target vehicle position from said antennas; means coupled to said pair of antennas and responsive to said phase difference for producing direction cosine information of the target position based on said second wavelength spacing; and means for correcting the direction cosine information produced by the last-named means based on the difference between said first and second wavelengths.

6. The system according to claim 5 including, in addition, means for producing additional corrective direction cosine information based on changes of wavelength of the signal received at said antenna pair.

7. In combination: at least first and second target vehicles; first and second transmitters located in said first and second target vehicles, respectively, and transmitting signals having $\lambda_1$ and $\lambda_2$ wavelengths, respectively; first and second crossed-baseline antenna systems, each of said baseline antenna systems including a plurality of antenna pairs, each of said pairs being spaced in accordance with a $\lambda_3$ signal wavelength; means employed with each of the baseline antenna systems of said first and second crossed-baseline systems for producing direction cosine information of the phase difference between the signals transmitted by said first and second transmitters and received at each of said antenna pairs; and means for producing corrective information for the direction cosine information produced by each of the last-named means based on the difference between the transmitted $\lambda_1$ and $\lambda_2$ wavelength signals of said first and second transmitters and the $\lambda_3$ wavelength spacings between said plurality of antenna pairs.

8. The combination according to claim 7 including, in addition, means responsive to frequency drifts in the first and second transmitters in said first and second target vehicles, respectively, for producing additional information for correcting the direction cosine information produced by each of said last-named means.

9. An electronic system for deriving continuous spatial coordinate information of at least first and second vehicles, said first and second vehicles transmitting constant signals of first and second frequencies, respectively, said system comprising: first and second spaced crossed-baseline antenna system, each baseline of each crossed-baseline antenna system including at least one antenna pair adapted to receive the signals transmitted by said first and second vehicles; receiving means associated with the antenna pair of each antenna baseline, each of the receiving means producing first and second pairs of output signals corresponding to the signals transmitted by said first and second vehicles, respectively, the phase difference between each pair of said first and second output signal pairs corresponding to the phase difference existing between the first and second target transmitted signals, respectively, as received at the associated antenna pair, said phase difference corresponding to the direction cosine of the associated target vehicle from the associated antenna pair; first and second readout means associated with each receiving means, each of the readout means being responsive to a pair of applied signals for indicating the phase difference therebetween; and means for applying the first and second signal pairs from each receiving means to the first and second readout means associated therewith whereby the direction cosine from each antenna pair to each target is indicated.

10. An electronic system for producing continuous spatial coordinate information of the paths made by a series of airborne target vehicles, said series of vehicles transmitting a series of different signal frequencies, respectively, said system comprising: first, second, third and fourth antenna lines, each of said antenna lines including a plurality of antenna pairs, each of said antenna pairs receiving the series of signals transmitted by said series of target vehicles, said first and second antenna lines and said third and fourth antenna lines intersecting each other at right angles; a plurality of receiving means associated with each antenna line, one for each antenna pair, each of said receiving means being coupled to its associated antenna pair and producing a series of output signals, each of said output signals including direction cosine information of its corresponding target vehicle relative to the associated antenna pair; a series of readout means associated with each antenna line, one for each of said target vehicles, each of said readout means being responsive to the receipt of a plurality of output signals corresponding to its associated target vehicle from the plurality of receiving means in said associated antenna line for producing an indication of the direction cosine information of its associated target vehicle from the associated antenna line; and means associated with each antenna line for applying the plurality of output signals corresponding to each of said series of target vehicles from said plurality of receiving means to the corresponding readout means of said series of readout means whereby readout direction cosine information is produced at the series of readout means at each antenna line for each of said series of target vehicles.

11. The electronic system according to claim 10 including, in addition, first and second signal generating means associated with said first and second antenna lines and with said third and fourth antenna lines, respectively, each of said signal generating means producing an audio frequency signal and first and second radio frequency signals separated by a phase and frequency corresponding to said audio frequency signal, and means for applying the audio and said first and second radio frequency signals of each of said first and second signal generating means to each of the receiver means associated with said first and second and with said third and fourth antenna lines, respectively, the frequencies of the series of output signals produced by each of said receiving means being of said audio signal frequency and having a phase relationship thereto corresponding to the direction cosines of the series of targets relative to the associated antenna pair.

12. The electronic system according to claim 11 wherein each of said readout means includes a plurality of channels, one for each of the plurality of signals received from the series of receiving means at its associated antenna line, each of said channels including actuable means responsive when actuated to a null condition for indicating the phase between the audio signal produced by the associated signal generating means and the output signal of its corresponding receiving means at its associated antenna line, and means for selectively actuating the actuable means in said plurality of channels for achieving simultaneous null in said plurality of channels whereby said readout means presents direction cosine information of its associated target vehicle from its associated antenna line.

13. The electronic system according to claim 12 wherein the plurality of antenna pairs in said first, second, third and fourth antenna lines are separated by a plurality of distances, respectively, said plurality of distances corresponding to one signal wavelength, the series of wavelengths of said series of target-transmitted signals being different from said one signal wavelength, said system including, in addition, first corrective means associated with each of said readout means for producing first corrective information for its indicated direction cosine information, said first corrective information being based on the difference between the one signal wavelength spacing employed for said plurality of antenna pairs and the wavelength of the signal transmitted by the corresponding target whose direction cosine information is being indicated.

14. The electronic system according to claim 13 wherein said first corrective means in each of said readout means produces a signal representing said direction cosine information, the potential magnitude of said signal being related to the ratio of said one signal wavelength to the wavelength of the signal transmitted by its associated target vehicle.

15. The electronic system according to claim 14 including, in addition, second corrective means associated with each of said readout means, said second corrective means producing second corrective information for its indicated direction cosine information based on changes of wavelength of the signal transmitted by its associated target vehicle as received on its corresponding antenna line.

16. The electronic system according to claim 15 wherein each of said second means includes digital counting means for deriving digital counts at periodic sampling intervals representing the average transmitted signal frequencies from its associated target vehicle during the sampling intervals.

17. An electronic system for deriving continuous spatial coordinate information of the position of a vehicle, said vehicle transmitting a signal, said system comprising: a first crossed-baseline antenna system including first and second pairs of antennas for receiving the signal transmitted by said vehicle, the baselines of said first and second antenna pairs bisecting each other at right angles; first and second means coupled to said first and second antenna pairs, respectively, and responsive to the phase difference between the signals received on said first and second antenna pairs, respectively, for producing first and second direction cosine information, respectively, of the vehicle position, said first and second direction cosine information representing a first direction vector pointing to the vehicle; a second crossed-baseline antenna system including third and fourth antenna pairs for receiving the signal transmitted by said vehicle, the baselines of said third and fourth antenna pairs bisecting each other at right angles; and third and fourth means coupled to said third and fourth antenna pairs, respectively, and responsive to the phase difference between the signals received on said third and fourth antenna pairs, respectively, for producing third and fourth direction cosine information representing a second direction vector pointing to the target, the intersection of said first and second direction vectors representing spatial coordinate information of the vehicle position.

References Cited in the file of this patent

UNITED STATES PATENTS

| | | |
|---|---|---|
| 2,067,980 | Nicolson | Jan. 19, 1937 |
| 2,608,685 | Hastings | Aug. 26, 1952 |
| 2,611,127 | Palmer | Sept. 16, 1952 |
| 2,651,032 | Torcheux et al. | Sept. 1, 1953 |